(12) United States Patent
Greenwood et al.

(10) Patent No.: US 8,291,407 B2
(45) Date of Patent: Oct. 16, 2012

(54) SYSTEMS AND METHODS FOR PATCHING COMPUTER PROGRAMS

(75) Inventors: Mark A. Greenwood, North Sydney (AU); Randall R. Cook, Springville, UT (US); Scott G. Hopwood, Pymble (AU); Robert P. Palethorpe, North Sydney (AU)

(73) Assignee: Symantec Corporation, Mountain View, CA (US)

( * ) Notice: Subject to any disclaimer, the term of this patent is extended or adjusted under 35 U.S.C. 154(b) by 1429 days.

(21) Appl. No.: 11/901,327

(22) Filed: Sep. 17, 2007

(65) Prior Publication Data
US 2008/0295086 A1      Nov. 27, 2008

Related U.S. Application Data

(63) Continuation-in-part of application No. 11/026,520, filed on Dec. 30, 2004, now Pat. No. 7,620,956, which is a continuation-in-part of application No. 10/459,936, filed on Jun. 11, 2003, now Pat. No. 7,117,495, application No. 11/901,327, which is a continuation-in-part of application No. 11/027,489, (Continued)

(51) Int. Cl.
*G06F 9/445* (2006.01)
(52) U.S. Cl. ......... 717/174; 717/168; 717/172; 717/176
(58) Field of Classification Search ........... 717/168–178
See application file for complete search history.

(56) References Cited

U.S. PATENT DOCUMENTS 5,155,847 A * 10/1992 Kirouac et al. ............... 709/221

(Continued)

OTHER PUBLICATIONS

Gerald Carter; Patch32 : A System for Automated Client OS Updates; published in the Proceedings of the Large Installation System Administration of Windows NT Conference Seattle, Washington, Aug. 5-8, 1998; pp. 1-11.*

(Continued)

*Primary Examiner* — Wei Zhen
*Assistant Examiner* — Satish Rampuria
(74) *Attorney, Agent, or Firm* — Advantedge Law Group

(57) ABSTRACT

The disclosure is directed to systems and methods for patching computer programs. In one example, a patch is virtually installed to a computing device having a base file system and configuration, a computer program, and a patch layering subsystem. The virtual installation may include storing content of the patch to a patch layer, and generating and storing mapping data defining at least one relationship between the content in the patch layer and content in the base file system and configuration. The virtually installed patch may be enabled, including applying the mapping data to the patch layering subsystem such that the patch layering subsystem is configured for selectively redirecting access requests from the base file system and configuration to the patch layer. In certain embodiments, the enabled patch may be disabled by reversing the application of the mapping data to the patch layering subsystem.

20 Claims, 11 Drawing Sheets

Related U.S. Application Data filed on Dec. 30, 2004, now Pat. No. 7,496,931, and a continuation-in-part of application No. 11/081,856, filed on Mar. 16, 2005, now Pat. No. 7,512,977, which is a continuation-in-part of application No. 10/459,936, application No. 11/901,327, which is a continuation-in-part of application No. 11/082,194, filed on Mar. 16, 2005, now Pat. No. 7,549,164, which is a continuation-in-part of application No. 10/459,936, application No. 11/901,327, which is a continuation-in-part of application No. 11/324,565, filed on Jan. 3, 2006, now Pat. No. 7,886,291, which is a continuation-in-part of application No. 10/459,936, and a continuation-in-part of application No. 10/459,768, filed on Jun. 11, 2003, now Pat. No. 7,162,724, and a continuation-in-part of application No. 10/459,870, filed on Jun. 11, 2003, now Pat. No. 7,165,260, and a continuation-in-part of application No. 11/026,520, which is a continuation-in-part of application No. 10/459,936, said application No. 11/324,565 is a continuation-in-part of application No. 11/027,489, and a continuation-in-part of application No. 11/081,856, which is a continuation-in-part of application No. 10/459,936, said application No. 11/324,565 is a continuation-in-part of application No. 11/082,194, which is a continuation-in-part of application No. 10/459,936, application No. 11/901,327, which is a continuation-in-part of application No. 11/324,571, filed on Jan. 3, 2006, which is a continuation-in-part of application No. 10/459,936, and a continuation-in-part of application No. 10/459,768, and a continuation-in-part of application No. 10/459,870, and a continuation-in-part of application No. 11/026,520, which is a continuation-in-part of application No. 10/459,936, said application No. 11/324,571 is a continuation-in-part of application No. 11/027,489, and a continuation-in-part of application No. 11/081,856, which is a continuation-in-part of application No. 10/459,936, said application No. 11/324,571 is a continuation-in-part of application No. 11/082,194, which is a continuation-in-part of application No. 10/459,936, application No. 11/901,327, which is a continuation-in-part of application No. 11/324,375, filed on Jan. 3, 2006, now Pat. No. 8,010,961, which is a continuation-in-part of application No. 10/459,936, and a continuation-in-part of application No. 10/459,768, and a continuation-in-part of application No. 10/459,870, and a continuation-in-part of application No. 11/026,520, which is a continuation-in-part of application No. 10/459,936, said application No. 11/324,375 is a continuation-in-part of application No. 11/027,489, and a continuation-in-part of application No. 11/081,856, which is a continuation-in-part of application No. 10/459,936, said application No. 11/324,375 is a continuation-in-part of application No. 11/082,194, which is a continuation-in-part of application No. 10/459,936, application No. 11/901,327, which is a continuation-in-part of application No. 11/324,607, filed on Jan. 3, 2006, now Pat. No. 7,461,096, which is a continuation-in-part of application No. 10/459,936, and a continuation-in-part of application No. 10/459,768, and a continuation-in-part of application No. 10/459,870, and a continuation-in-part of application No. 11/026,520, which is a continuation-in-part of application No. 10/459,936, said application No. 11/324,607 is a continuation-in-part of application No. 11/027,489, and a continuation-in-part of application No. 11/081,856, which is a continuation-in-part of application No. 10/459,936, said application No. 11/324,607 is a continuation-in-part of application No. 11/082,194, which is a continuation-in-part of application No. 10/459,936, application No. 11/901,327, which is a continuation-in-part of application No. 11/324,545, filed on Jan. 3, 2006, now Pat. No. 7,542,988, which is a continuation-in-part of application No. 10/459,936, and a continuation-in-part of application No. 10/459,768, and a continuation-in-part of application No. 10/459,870, and a continuation-in-part of application No. 11/026,520, which is a continuation-in-part of application No. 10/459,936, said application No. 11/324,545 is a continuation-in-part of application No. 11/027,489, and a continuation-in-part of application No. 11/081,856, which is a continuation-in-part of application No. 10/459,936, said application No. 11/324,545 is a continuation-in-part of application No. 11/082,194, which is a continuation-in-part of application No. 10/459,936, application No. 11/901,327, which is a continuation-in-part of application No. 11/324,572, filed on Jan. 3, 2006, now Pat. No. 7,877,413, which is a continuation-in-part of application No. 10/459,936, and a continuation-in-part of application No. 10/459,768, and a continuation-in-part of application No. 10/459,870, and a continuation-in-part of application No. 11/026,520, which is a continuation-in-part of application No. 10/459,936, said application No. 11/324,572 is a continuation-in-part of application No. 11/027,489, and a continuation-in-part of application No. 11/081,856, which is a continuation-in-part of application No. 10/459,936, said application No. 11/324,572 is a continuation-in-part of application No. 11/082,194, which is a continuation-in-part of application No. 10/459,936, application No. 11/901,327, which is a continuation-in-part of application No. 11/324,573, filed on Jan. 3, 2006, now Pat. No. 7,461,086, which is a continuation-in-part of application No. 10/459,936, and a continuation-in-part of application No. 10/459,768, and a continuation-in-part of application No. 10/459,870, and a continuation-in-part of application No. 11/026,520, which is a continuation-in-part of application No. 10/459,936, said application No. 11/324,573 is a continuation-in-part of application No. 11/027,489, and a continuation-in-part of application No. 11/081,856, which is a continuation-in-part of application No. 10/459,936, said application No. 11/324,573 is a continuation-in-part of application No. 11/082,194, which is a continuation-in-part of application No. 10/459,936, application No. 11/901,327, which is a continuation-in-part of application No. 11/324,496, filed on Jan. 3, 2006, now Pat. No. 7,970,789, which is a continuation-in-part of application No. 10/459,936, and a continuation-in-part of application No. 10/459,768, and a continuation-in-part of application No. 10/459,870, and a continuation-in-part of application No. 11/026,520, which is a continuation-in-part of application No. 10/459,936, said application No. 11/324,496 is a continuation-in-part of application No. 11/027,489, and a continuation-in-part of application No. 11/081,856, which is a continuation-in-part of application No. 10/459,936, said application No. 11/324,496 is a continuation-in-part of application No. 11/082,194, which is a continuation-in-part of application No. 10/459,936, application No. 11/901,327, which is a continuation-in-part of application No. 11/528,858, filed on Sep. 28, 2006, now Pat. No. 7,945,897, which is a continuation-in-part of application No. 10/459,936, and a continuation-in-part of application No. 10/459,768, and a continuation-in-part of application No. 10/459,870, and a continuation-in-part of application No. 11/026,520, which is a continuation-in-part of application No. 10/459,936, said application No. 11/528,858 is a continuation-in-part of application No. 11/027,489, and a continuation-in-part of application No. 11/081,856, which is a continuation-in-part of application No. 10/459,936, said application No. 11/528,858 is a continuation-in-part of application No. 11/082,194, which is a continuation-in-part of application No. 10/459,936, said application No. 11/528,858 is a continuation-in-part of application No. 11/324,565, which is a continuation-in-part of application No. 10/459,936, and a continuation-in-part of application No. 10/459,768, and a continuation-in-part of application No. 10/459,870, and a continuation-in-part of application No. 11/026,520, which is a continuation-in-part of application No. 10/459,936, said application No. 11/324,565 is a continuation-in-part of application No. 11/027,489, and a continuation-in-part of application No. 11/081,856, which is a continuation-in-part of application No. 10/459,936, said application No. 11/324,565 is a continuation-in-part of application No. 11/082,194, which is a continuation-in-part of application No. 10/459,936, said application No. 11/528,858 is a continuation-in-part of application No. 11/324,571, which is a continuation-in-part of application No. 10/459,936, and a continuation-in-part of application No. 10/459,768, and a continuation-in-part of application No. 10/459,870, and a continuation-in-part of application No. 11/026,520, which is a continuation-in-part of application No. 10/459,936, said application No. 11/324,571 is a continuation-in-part of application No. 11/027,489, said application No. 11/324,571 is a continuation-in-part of application No. 11/081,856, which is a continuation-in-part of application No. 10/459,936, said application No. 11/324,571 is a continuation-in-part of application No. 11/082,194, which is a continuation-in-part of application No. 10/459,936, said application No. 11/324,545 is a continuation-in-part of application No. 10/459,936, said application No. 11/528,858 is a continuation-in-part of application No. 11/324,375, which is a continuation-in-part of application No. 10/459,936, and a continuation-in-part of application No. 10/459,768, and a continuation-in-part of application No. 10/459,870, and a continuation-in-part of application No. 11/026,520, which is a continuation-in-part of application No. 10/459,936, said application No. 11/324,375 is a continuation-in-part of application No. 11/027,489, and a continuation-in-part of application No. 11/081,856, which is a continuation-in-part of application No. 10/459,936, said application No. 11/324,375 is a continuation-in-part of application No. 11/082,194, which is a continuation-in-part of application No. 10/459,936, said application No. 11/528,858 is a continuation-in-part of application No. 11/324,607, which is a continuation-in-part of application No. 10/459,936, and a continuation-in-part of application No. 10/459,768, and a continuation-in-part of application No. 10/459,870, and a continuation-in-part of application No. 11/026,520, which is a continuation-in-part of application No. 10/459,936, said application No. 11/324,607 is a continuation-in-part of application No. 11/027,489, and a continuation-in-part of application No. 11/081,856, which is a continuation-in-part of application No. 10/459,936, said application No. 11/324,607 is a continuation-in-part of application No. 11/082,194, which is a continuation-in-part of application No. 10/459,936, said application No. 11/528,858 is a continuation-in-part of application No. 11/324,545, which is a continuation-in-part of application No. 10/459,936, and a continuation-in-part of application No. 10/459,768, and a continuation-in-part of application No. 10/459,870, and a continuation-in-part of application No. 11/026,520, which is a continuation-in-part of application No. 10/459,936, said application No. 11/324,545 is a continuation-in-part of application No. 11/027,489, and a continuation-in-part of application No. 11/081,856, which is a continuation-in-part of application No. 10/459,936, said application No. 11/324,545 is a continuation-in-part of application No. 11/082,194, which is a continuation-in-part of application No. 10/459,936, said application No. 11/528,858 is a continuation-in-part of application No. 11/324,572, which is a continuation-in-part of application No. 10/459,936, and a continuation-in-part of application No. 10/459,768, said application No. 11/324,572 is a continuation-in-part of application No. 10/459,870, and a continuation-in-part of application No. 11/026,520, which is a continuation-in-part of application No. 10/459,936, said application No. 11/324,572 is a continuation-in-part of application No. 11/027,489, and a continuation-in-part of application No. 11/081,856, which is a continuation-in-part of application No. 10/459,936, said application No. 11/324,572 is a continuation-in-part of application No. 11/082,194, which is a continuation-in-part of application No. 10/459,936, said application No. 11/528,858 is a continuation-in-part of application No. 11/324,573, which is a continuation-in-part of application No. 10/459,936, and a continuation-in-part of application No. 10/459,768, and a continuation-in-part of application No. 10/459,870, and a continuation-in-part of application No. 11/026,520, which is a continuation-in-part of application No. 10/459,936, said application No. 11/324,573 is a continuation-in-part of application No. 11/027,489, and a continuation-in-part of application No. 11/081,856, which is a continuation-in-part of application No. 10/459,936, said application No. 11/324,573 is a continuation-in-part of application No. 11/082,194, which is a continuation-in-part of application No. 10/459,936, said application No. 11/528,858 is a continuation-in-part of application No. 11/324,496, which is a continuation-in-part of application No. 10/459,936, and a continuation-in-part of application No. 10/459,768, and a continuation-in-part of application No. 10/459,870, and a continuation-in-part of application No. 11/026,520, which is a continuation-in-part of application No. 10/459,936, said application No. 11/324,496 is a continuation-in-part of application No. 11/027,489, and a continuation-in-part of application No. 11/081,856, which is a continuation-in-part of application No. 10/459,936, said application No. 11/324,496 is a continuation-in-part of application No. 11/082,194, which is a continuation-in-part of application No. 10/459,936.

(60) Provisional application No. 60/387,969, filed on Jun. 12, 2002, provisional application No. 60/533,388, filed on Dec. 30, 2003.

(56) References Cited

U.S. PATENT DOCUMENTS

| | | | |
|---|---|---|---|
| 5,991,753 A | 11/1999 | Wilde | |
| 6,195,650 B1 | 2/2001 | Gaither et al. | |
| 6,526,574 B1* | 2/2003 | Jones | 717/168 |
| 6,763,517 B2* | 7/2004 | Hines | 717/124 |
| 7,117,495 B2 | 10/2006 | Blaser et al. | |
| 7,162,724 B2 | 1/2007 | Blaser et al. | |
| 7,165,260 B2 | 1/2007 | Blaser et al. | |
| 7,461,086 B1 | 12/2008 | Hurren et al. | |
| 7,461,096 B1 | 12/2008 | Hurren et al. | |
| 7,496,931 B2 | 2/2009 | Cook et al. | |
| 7,512,977 B2 | 3/2009 | Cook et al. | |
| 7,519,963 B1 | 4/2009 | Blaser et al. | |
| 7,542,988 B1 | 6/2009 | Cook et al. | |
| 7,549,164 B2 | 6/2009 | Cook et al. | |
| 7,620,956 B2 | 11/2009 | Cook et al. | |
| 7,877,413 B1 | 1/2011 | Cook et al. | |
| 7,886,291 B1 | 2/2011 | Jones et al. | |
| 7,945,897 B1 | 5/2011 | Cook | |
| 7,970,789 B1 | 6/2011 | Blaser et al. | |
| 8,010,961 B1 | 8/2011 | Cook et al. | |
| 2002/0100036 A1* | 7/2002 | Moshir et al. | 717/173 |
| 2002/0174215 A1 | 11/2002 | Schaefer | |
| 2003/0233647 A1 | 12/2003 | Blaser et al. | |
| 2004/0015949 A1* | 1/2004 | Taylor | 717/171 |
| 2007/0180450 A1 | 8/2007 | Croft et al. | |
| 2011/0061045 A1 | 3/2011 | Phillips | |

OTHER PUBLICATIONS

Graupner, S.; Kotov, V.; Trinks, H.; , "Resource-sharing and service deployment in virtual data centers," Distributed Computing Systems Workshops, 2002, pp. 1-6, doi: 10.1109/ICDCSW.2002.1030845; URL: http://ieeexplore.ieee.org/stamp/stamp.jsp?tp=& arnumber=1030845&isnumber=22138.*

U.S. Appl. No. 11/528,858, filed Sep. 28, 2006, Cook.
U.S. Appl. No. 11/324,496, filed Jan. 3, 2006, Blaser et al.
U.S. Appl. No. 11/324,572, filed Jan. 3, 2006, Cook et al.
U.S. Appl. No. 11/324,375, filed Jan. 3, 2006, Cook et al.
U.S. Appl. No. 11/324,571, filed Jan. 3, 2006, Blaser et al.
U.S. Appl. No. 11/324,565, filed Jan. 3, 2006, Jones et al.
U.S. Appl. No. 11/026,520, filed Dec. 30, 2004, Cook et al.
Search Report and Written Opinion received in related European Application No. EP 8164483.3; Feb. 9, 2009.
Sipek, Josef et al.; "Kernel Support for Stackable File Systems;" Proceedings of the Linux Symposium; Jul. 27, 2007; pp. 223-228; Canada.
Quigly, D.P. et al; "Unionfs: User-and-Community-Oriented Development of a Unification Filesystem;" Proceedings of the 2006 Linux Symposium; Jul. 2006; pp. 349-362, Canada.
Zadok, Erez et al.; "On Incremental File System Development;" ACM Transactions on Storage; May 2, 2006; vol. 2; pp. 1-33.
Wright, Charles et al.; "Kernel Korner:Unionfs: Bringing Filesystems Together;" Linux Journal; Dec. 1, 2004; pp. 1-6; vol. 2004 No. 128; Westport, CT, US.
Zadok, E. et al.; "Fist: A Language for Stackable File Systems;" Proceedings of the Usenix Annual Technical Conference; Jan. 1, 2000; pp. 55-70.
Wright, Charles et al.; "Versatility and Unix Semantics in Namespace Unification;" ACM Transactions on Storage ACM; Nov. 1, 2005; pp. 1-29.
Ashley, Mitchell; Layered Network Security: A Best-Practices Approach; Latis Networks, Inc.; Jan. 2003.
Mosberger et al., Making Paths Explicit in the Scout Operating System, Oct. 1996.
Jared Blaser; Process Tracking Application Layered System; U.S. Appl. No. 11/324,571, filed Jan. 3, 2006.
Non-Final Office Action received in related U.S. Appl. No. 11/324,571; Jul. 9, 2010.
Final Office Action received in related U.S. Appl. No. 11/324,571, Nov. 26, 2010.
Randall Cook; Systems, Apparatus, and Methods for Layered Execution; U.S. Appl. No. 11/959,700, filed Dec. 19, 2007.
Non-Final Office Action received in related U.S. Appl. No. 11/959,700; Jul. 22, 2011.
Randall Cook; Dynamic Insertion and Removal of Virtual Software Sub-Layers; U.S. Appl. No. 12/058,782, filed Mar. 31, 2008.
Non-Final Office Action received in related U.S. Appl. No. 12/058,782; Aug. 3, 2011.
Jordan Sanderson; Methods and Systems for Activating and Deactivating Virtualization Layers; U.S. Appl. No. 12/414,170, filed Mar. 30, 2009.
Karl Bunnell et al.; Methods and Systems for Merging Virtualization Sublayers; U.S. Appl. No. 12/396,969, filed Mar. 3, 2009.
Lance TeNgaio; Distributed Application Virtualization; U.S. Appl. No. 12/142,549, filed Jun. 19, 2008.
Jeremy Hurren; Systems and Methods for Maintaining Settings for Multiple Applications; U.S. Appl. No. 12/147,939, filed Jun. 27, 2008.
Jeremy Hurren; Feature Based Software Virtualization; U.S. Appl. No. 11/960,706, filed Dec. 20, 2007.
Karl Bunnell et al.; Methods and Systems for Creating and Applying Patches for Virtualized Applications; U.S. Appl. No. 12/369,512, filed Feb. 11, 2009.
Randall Cook; Automatic Virtualization Based on User-Defined Criteria; U.S. Appl. No. 12/024,079, filed Jan. 31, 2008.
Karl Bunnell; Methods and Systems for Creating Snapshots of Virtualized Applications; U.S. Appl. No. 12/371,116, filed Feb. 13, 2009.
Cynthia Bringhurst; Systems and Methods for Virtualizing Software Associated with External Computer Hardware Devices; U.S. Appl. No. 12/554,413, filed Sep. 4, 2009.
Bradley Baird; Systems and Methods for Merging Virtual Layers; U.S. Appl. No. 12/843,098, filed Jul. 26, 2010.
Bruce McCordendale; Systems and Methods for Controlling Access to Data Through Application Virtualization Layers; U.S. Appl. No. 12/147,700, filed Jun. 27, 2008.
Michael Spertus; Systems and Methods for Using Virtualization to Implement Information Rights Management; U.S. Appl. No. 12/715,213, filed Mar. 1, 2010.

* cited by examiner

SYSTEMS AND METHODS FOR PATCHING COMPUTER PROGRAMS

CROSS-REFERENCE INFORMATION

This is a continuation-in-part of U.S. patent application Ser. No. 11/026,520 filed Dec. 30, 2004, which claims the benefit of U.S. provisional patent application Ser. No. 60/533,388 filed on Dec. 30, 2003 and is a continuation-in-part of U.S. patent application Ser. No. 10/459,936 filed Jun. 11, 2003 (now U.S. Pat. No. 7,117,495 issued Oct. 3, 2006), which claims the benefit of U.S. provisional patent application Ser. No. 60/387,969 filed on Jun. 12, 2002.

This is a continuation-in-part of U.S. patent application Ser. No. 11/027,489 filed Dec. 30, 2004, which claims the benefit of U.S. provisional patent application Ser. No. 60/533,388 filed on Dec. 30, 2003.

This is a continuation-in-part of U.S. patent application Ser. Nos. 11/081,856 and 11/082,194 filed Mar. 16, 2005, each of which is a continuation-in-part of U.S. patent application Ser. No. 10/459,936 filed Jun. 11, 2003 (now U.S. Pat. No. 7,117,495 issued Oct. 3, 2006), which claims the benefit of U.S. provisional patent application Ser. No. 60/387,969 filed on Jun. 12, 2002.

This is a continuation-in-part of U.S. patent application Ser. Nos. 11/324,565, 11/324,571, 11/324,375, 11/324,607, 11/324,545, 11/324,572, 11/324,573 and 11/324,496 filed Jan. 3, 2006, each of which is a continuation-in-part of U.S. patent application Ser. Nos. 10/459,936 (now U.S. Pat. No. 7,117,495 issued Oct. 3, 2006), Ser. No. 10/459,768 (now U.S. Pat. No. 7,162,724 issued Jan. 9, 2007), and Ser. No. 10/459,870 (now U.S. Pat. No. 7,165,260 issued Jan. 16, 2007) filed Jun. 11, 2003, which claim the benefit of U.S. provisional patent application Ser. No. 60/387,969 filed on Jun. 12, 2002; a continuation in part of U.S. patent application Ser. No. 11/026,520 filed Dec. 30, 2004, which claims the benefit of U.S. provisional patent application Ser. No. 60/533,388 filed on Dec. 30, 2003 and is a continuation-in-part of U.S. patent application Ser. No. 10/459,936 filed Jun. 11, 2003 (now U.S. Pat. No. 7,117,495 issued Oct. 3, 2006), which claims the benefit of U.S. provisional patent application Ser. No. 60/387,969 filed on Jun. 12, 2002; a continuation in part of U.S. patent application Ser. No. 11/027,489 filed Dec. 30, 2004, which claims the benefit of U.S. provisional patent application Ser. No. 60/533,388 filed on Dec. 30, 2003; and a continuation in part of U.S. patent application Ser. Nos. 11/081,856 and 11/082,194 filed Mar. 16, 2005, each of which is a continuation-in-part of U.S. patent application Ser. No. 10/459,936 filed Jun. 11, 2003 (now U.S. Pat. No. 7,117,495 issued Oct. 3, 2006), which claims the benefit of U.S. provisional patent application Ser. No. 60/387,969 filed on Jun. 12, 2002.

This is a continuation-in-part of U.S. patent application Ser. No. 11/528,858 filed Sep. 28, 2006, which is a continuation-in-part of Ser. No. 10/459,936 (now U.S. Pat. No. 7,117,495 issued Oct. 3, 2006), Ser. No. 10/459,768 (now U.S. Pat. No. 7,162,724 issued Jan. 9, 2007), and Ser. No. 10/459,870 (now U.S. Pat. No. 7,165,260 issued Jan. 16, 2007) filed Jun. 11, 2003, which claim the benefit of U.S. provisional patent application Ser. No. 60/387,969 filed on Jun. 12, 2002; a continuation in part of U.S. patent application Ser. No. 11/026,520 filed Dec. 30, 2004, which claims the benefit of U.S. provisional patent application Ser. No. 60/533,388 filed on Dec. 30, 2003 and is a continuation-in-part of U.S. patent application Ser. No. 10/459,936 filed Jun. 11, 2003 (now U.S. Pat. No. 7,117,495 issued Oct. 3, 2006), which claims the benefit of U.S. provisional patent application Ser. No. 60/387,969 filed on Jun. 12, 2002; a continuation in part of U.S. patent application Ser. No. 11/027,489 filed Dec. 30, 2004, which claims the benefit of U.S. provisional patent application Ser. No. 60/533,388 filed on Dec. 30, 2003; a continuation in part of U.S. patent application Ser. Nos. 11/081,856 and 11/082,194 filed Mar. 16, 2005, each of which is a continuation-in-part of U.S. patent application Ser. No. 10/459,936 (now U.S. Pat. No. 7,117,495 issued Oct. 3, 2006), Ser. No. 10/459,768 (now U.S. Pat. No. 7,162,724 issued Jan. 9, 2007), and Ser. No. 10/459,870 (now U.S. Pat. No. 7,165,260 issued Jan. 16, 2007) filed Jun. 11, 2003, which claim the benefit of U.S. provisional patent application Ser. No. 60/387,969 filed on Jun. 12, 2002; a continuation in part of U.S. patent application Ser. No. 11/026,520 filed Dec. 30, 2004, which claims the benefit of U.S. provisional patent application Ser. No. 60/533,388 filed on Dec. 30, 2003 and is a continuation-in-part of U.S. patent application Ser. No. 10/459,936 filed Jun. 11, 2003 (now U.S. Pat. No. 7,117,495 issued Oct. 3, 2006), which claims the benefit of U.S. provisional patent application Ser. No. 60/387,969 filed on Jun. 12, 2002; a continuation in part of U.S. patent application Ser. No. 11/027,489 filed Dec. 30, 2004, which claims the benefit of U.S. provisional patent application Ser. No. 60/533,388 filed on Dec. 30, 2003; and a continuation in part of U.S. patent application Ser. Nos. 11/081,856 and 11/082,194 filed Mar. 16, 2005, each of which is a continuation-in-part of U.S. patent application Ser. No. 10/459,936 filed Jun. 11, 2003 (now U.S. Pat. No. 7,117,495 issued Oct. 3, 2006), which claims the benefit of U.S. provisional patent application Ser. No. 60/387,969 filed on Jun. 12, 2002.

The disclosures of the above patents and patent applications are hereby incorporated by reference in their entirety.

BACKGROUND INFORMATION

In computing, the term "patch" is commonly used to refer to an update designed to change a previous version of a computer program. Patches are commonly used to apply fixes to software insecurities and bugs. A typical manufacturer of a computer program periodically releases patches, and persons responsible for maintaining computer systems, such as a user or an administrator of a computer system, receive and install the patches in their respective computing systems.

However, the installation of a computer program patch can be nontrivial and fraught with potential problems. For example, an installed patch may be found to be defective, or it may interfere or conflict with other computer programs running on a computer, cause one of more computer programs to malfunction, or function improperly for a particular computing architecture. Moreover, remediation after installation of a patch, such as may be desired when installation of the patch has introduced problems into a computer system, can be very difficult and time consuming. In certain situations, a base version of a computer program may have to be uninstalled and then installed again in order to remove the effects introduced by an offending patch.

The problems associated with software patching are exacerbated for an administrator or organization maintaining a computer system having a large number of computers. In such an environment, uninstalling a patch can be extremely difficult. In certain situations in which an installed patch has caused problems, an administrator and his or her team may be forced to dedicate significant amounts of time inspecting files and registries of individual computers in the system and/or reinstalling computer programs to the computers in order to try to identify and repair problems caused by the patch.

Because of the potential problems and the magnitude of these problems associated with traditional installation of software patches, a common practice is for an administrator and his or her team to conduct "trial run" installations of a patch on dedicated "test computers"—computers that have been configured to mimic or otherwise represent computers on an actual network—and to first verify successful installation and operation on the test computers before installing the patch to computers on the actual network. This approach requires significant time and resources, including dedicated computing equipment, software licenses, and human labor. Nevertheless, organizations continue to use this approach because of the limitations of conventional software patching technologies and the potential costs associated with unsuccessful patch installations using standard technologies.

BRIEF SUMMARY

The disclosure is directed to systems and methods for patching computer programs.

It should be appreciated that the examples disclosed herein can be implemented in numerous ways, including as one or more processes, apparatuses, systems, devices, methods, computer readable media, or computer program products embodied on computer readable media.

In one example, a computer program patch is virtually installed to a computing device having a base file system and configuration, a computer program, and a patch layering subsystem. In certain embodiments, the virtual installation may include storing patch content to a patch layer, and generating and storing mapping data defining at least one relationship between the patch content in the patch layer and content of the base file system and configuration. The virtually installed patch may be enabled on the computing device. In certain embodiments, the patch is enabled by applying the mapping data to the patch layering subsystem such that the patch layering subsystem is configured to selectively redirect access requests (e.g., requests for files or configuration settings) from the base file system and configuration to the patch layer based on the mapping data. The enabled patch may be tested. The enabled patch may be disabled. In certain embodiments, the patch is disabled by reversing the application of the mapping data to the patch layering subsystem. The virtually installed patch may be "committed," i.e., actually installed, to the base file system and configuration of the computing device. In certain embodiments, the patch layer and/or the mapping data associated with the patch layer is utilized to commit the patch. The virtual installation, enabling, testing, disabling, and committing of the patch may be controlled locally or remotely. In certain embodiments, the patch layer subsystem is configured to perform the steps of virtually installing, enabling, disabling, and committing the patch. Additional details and exemplary embodiments are disclosed below.

BRIEF DESCRIPTION OF THE DRAWINGS

Various embodiments are described with reference to the accompanying drawings, wherein like reference numbers designate like elements, and in which.

DETAILED DESCRIPTION

Figure 1:
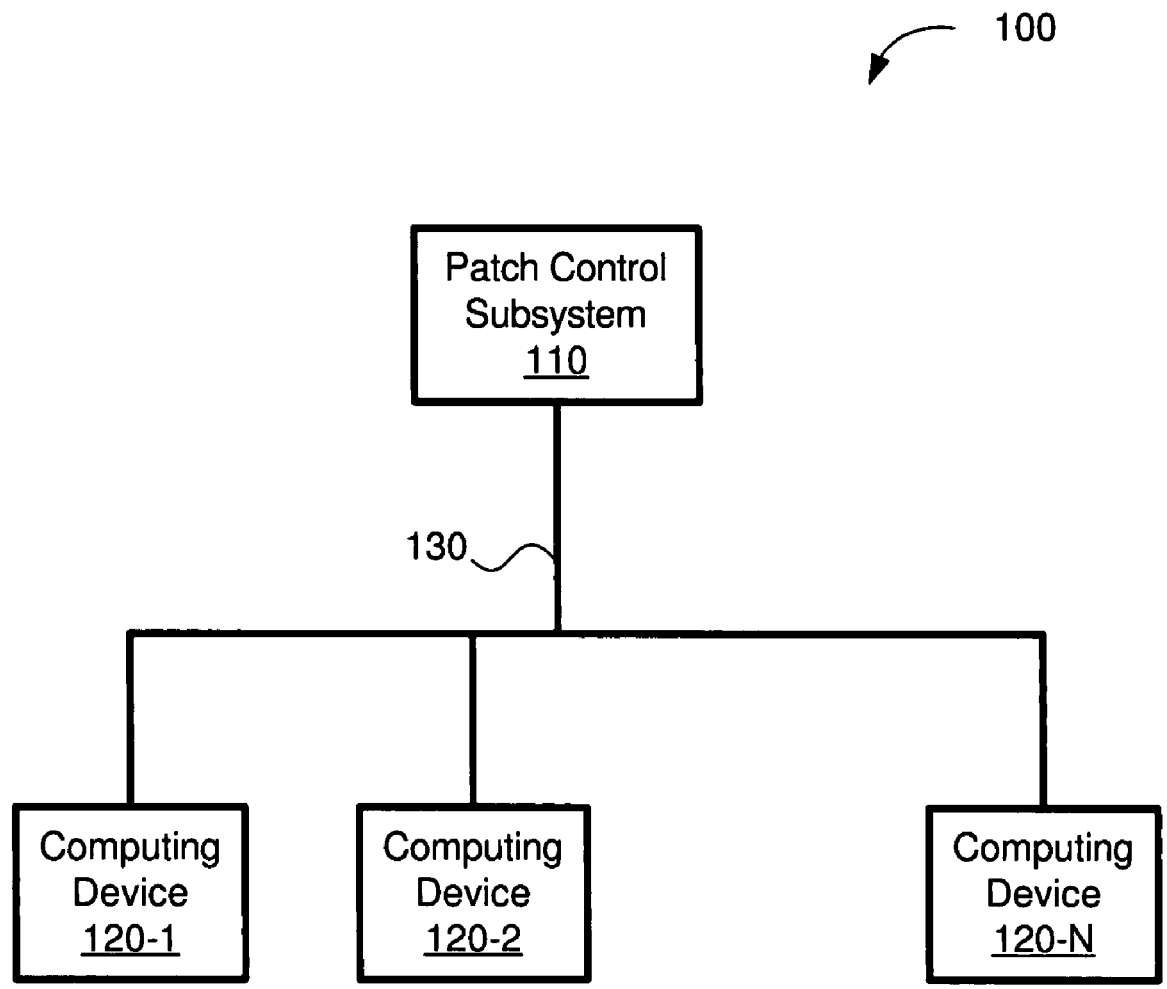
FIG. 1 illustrates an exemplary system for patching computer programs.

Embodiments described herein will be best understood by reference to the drawings. It will be readily understood that the components generally described and illustrated in the drawings herein, could be arranged and designed in a variety of different configurations. Thus, the following detailed description, as represented in the drawings, is not intended to limit the scope of the disclosure but is merely representative of certain embodiments.

General Concepts

Exemplary systems and methods for patching computer programs are described herein. As used herein, the term "computer programs" may refer broadly to any set of computer readable instructions embodied on one or more computer readable media, the instructions being executable by a computing device. Computer programs may include, but are not limited to, applications and operating systems.

In certain embodiments, a computer program patch may be virtually installed to a computing device having a base file system and configuration, a computer program, and a patch layering subsystem. The virtual installation of the patch may allow the patch to be enabled, tested, disabled, and/or "committed" (i.e., actually installed). In certain embodiments, for example, a virtually installed patch may be enabled by activating mapping data, which was produced during a virtual installation of the patch and is configured for use in selectively redirecting access requests for files and configuration settings from the base file system and configuration to the virtually installed patch. To a computer program (e.g., an application or operating system) running on the computing device, a virtually installed and enabled patch is configured to look and function as if the patch were actually installed to the base file system and configuration of the computing device. However, because the patch is virtually installed and enabled rather than actually installed, the patch can be disabled in a manner that is significantly cleaner and more convenient and stable than conventional uninstall or other remediation techniques. The "disable patch" feature can be especially beneficial when a virtually installed and enabled patch is tested and found not to operate properly or to introduce problems (e.g., conflicts) for other computer programs.

In addition, the virtually installed patch can be conveniently "committed" to the base file system and configuration of the computing device. For example, mapping data associated with the virtually installed patch can be utilized to transition the virtually installed patch to an actually installed patch. Thus, if a virtually installed and enabled patch is tested and verified to function properly, the virtually installed patch can be conveniently "committed" to the computing device. The "commit patch" feature is a convenient way to actually install a patch that has already been virtually installed, enabled, and tested. Committing virtual patches can be used to keep the number of virtually installed and enabled patches at an acceptable level. If the number of enabled patches were allowed to grow too large, operations associated with redirecting access requests to the appropriate patches could become a significant drain on computing resources.

The virtual installing, enabling, disabling, testing, and committing of a patch may be controlled from a remote location and may therefore facilitate convenient deployment of one or more patches over a computing network. For a network having a server and one or more computing devices communicatively connected to the server for example, the server may be configured for delivering a patch to one or more of the computing devices and remotely controlling the virtual installation, enabling, testing, disabling, and/or committing of the patch. Significantly, because remediation of a virtually installed and enabled patch is easy, a patch can be deployed over a network without first being subjected to testing in a separate testing environment. Accordingly, an administrator of a computing system or network is able to save time and other resources, including resources that would likely have been otherwise spent maintaining a separate testing environment and installing, testing, troubleshooting, and remediating patches in the separate testing environment, all before installing the patches to computing devices on the actual network or system.

Exemplary Systems

Turning now to the drawings, FIG. 1 illustrates an exemplary computing system 100 (or simply "the system 100") configured to support patching of computer programs as described herein. As shown, the computing system 100 may include a patch control subsystem 110 communicatively coupled to computing devices 120-1 through 120-N (collectively "the computing devices 120"). The patch control subsystem 110 and computing devices 120 may communicate with one another over a network 130 using any suitable communication technologies, including well known network communication technologies, devices, signals, and protocols capable of supporting the processes described herein. Network 130 may include any type and number of networks capable of carrying communication signals between devices connected to the network 130, including but not limited to a local area network, a wide area network, an intranet, or the Internet.

Patch control subsystem 110 may include one or more devices configured to communicate with computing devices 120 over network 130. In certain embodiments, for example, patch control subsystem 110 may include or be embodied on one or more servers such as Altiris® Notification Server™ software provided by Altiris, Inc., a division of Symantec Corporation. Patch control subsystem 110 may include and may be configured to execute computer readable instructions embodied on one or more computer readable media, the computer readable instructions being configured for controlling patch operations, including generating and transmitting data representative of patches, patch layers, patch commands, and/or test commands to computing devices 120. Accordingly, a user of patch control subsystem 110, such as an administrator of system 100, may utilize the patch control subsystem 110 to control operations for patching computer programs on the computing devices 120 over network 130.

For example, patch control subsystem 110 may receive or otherwise access a computer program patch distributed by an entity such as the manufacturer or distributor of a computer program. The patch may be made accessible for download over the Internet, for example. Under the direction of a user, patch control subsystem 110 may deliver the patch to one or more of the computing devices 120 over network 130. Data representative of the patch may be transmitted using any suitable technologies and in any acceptable form.

In certain embodiments, the patch control subsystem 110 may deliver an original install executable for the patch to a computing device 120, in which case the computing device 120 may be configured to use the executable to virtually install the patch. In other embodiments, the patch control subsystem 110 may virtually install the patch and export data representative of the virtually installed patch to the computing device 120, which may store the exported data to one or more memory locations in order to virtually install the patch to the computing device 110. Examples of how the computing device 120 and/or patch control subsystem 110 may virtually install a patch are described further below.

The patch control subsystem 110 may provide other control signals to the computing devices 120, including, but not limited to patch enable, disable, test, and commit commands. The computing devices 120 may be configured to perform certain operations in response to these commands, as described below.

A computing device 120 may include any hardware and computing instructions (e.g., software) capable of operating a computer program and supporting patching of the computer program as described herein. For example, the computing device may include, but is in no way limited to, a personal computer, a workstation, a personal digital assistant, or any device having a CPU, memory, input and output devices, at least one fixed disk, and at least one computer program that can be executed by the device. It is contemplated that the principles described herein may be applied to these and other computing systems and devices, both existing and yet to be developed, using the methods and principles disclosed herein. Likewise, although many of the examples below refer to a computing device with a single base file system and configuration, the concepts, principles and examples disclosed below may be extended to provide patching functionality across several or many accessible file systems and/or configurations.

In certain embodiments, computing system 100 may include any computer hardware and/or instructions (e.g., software programs), or combinations of software and hardware, configured to perform the processes described herein. In particular, it should be understood that system 100 may include any of a number of well known computing devices, and may employ any of a number of well known computer operating systems, including, but by no means limited to, known versions and/or varieties of the Microsoft Windows®, UNIX, Macintosh®, and Linux® operating systems.

Accordingly, the processes described herein may be implemented at least in part as instructions (e.g., one or more computer program products) embodied on computer readable media and executable by one or more computing devices. In general, a processor (e.g., a microprocessor) receives instructions, e.g., from a memory, a computer readable medium, etc., and executes those instructions, thereby performing one or more processes, including one or more of the processes described herein. Such instructions may be stored and transmitted using a variety of known computer readable media.

A computer readable medium (also referred to as a processor readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary computing system 100 is shown in FIG. 1, the exemplary components illustrated in FIG. 1 are not intended to be limiting. Indeed, additional or alternative components, implementations, or computing systems may be used to implement the principles and processes described herein.

In the system 100 shown in FIG. 1, a user of the patch control subsystem 110 may be provided with substantial control over patching operations, including capabilities for remotely controlling patching operations such as virtually installing, enabling, testing, disabling, and/or committing patches on one or more of the computing devices 120. As compared to conventional patching technologies, system 100 is able to provide a user of the patch control subsystem 110 with significantly improved capabilities for patching computer programs of a computer system. For example, a user of the patch control subsystem 110 may remotely instruct and cause a computing device 120 to disable a patch that has been virtually installed and enabled patch, or to commit a virtually installed patch, as described further below.

FIGS. 2A-G illustrate an exemplary patch system 200 as it may be implemented in a computing device environment such as an environment of one of the computing devices 120. FIGS. 2A-G show the patch system 200 at various stages of exemplary patching processes.

Figure 2A:
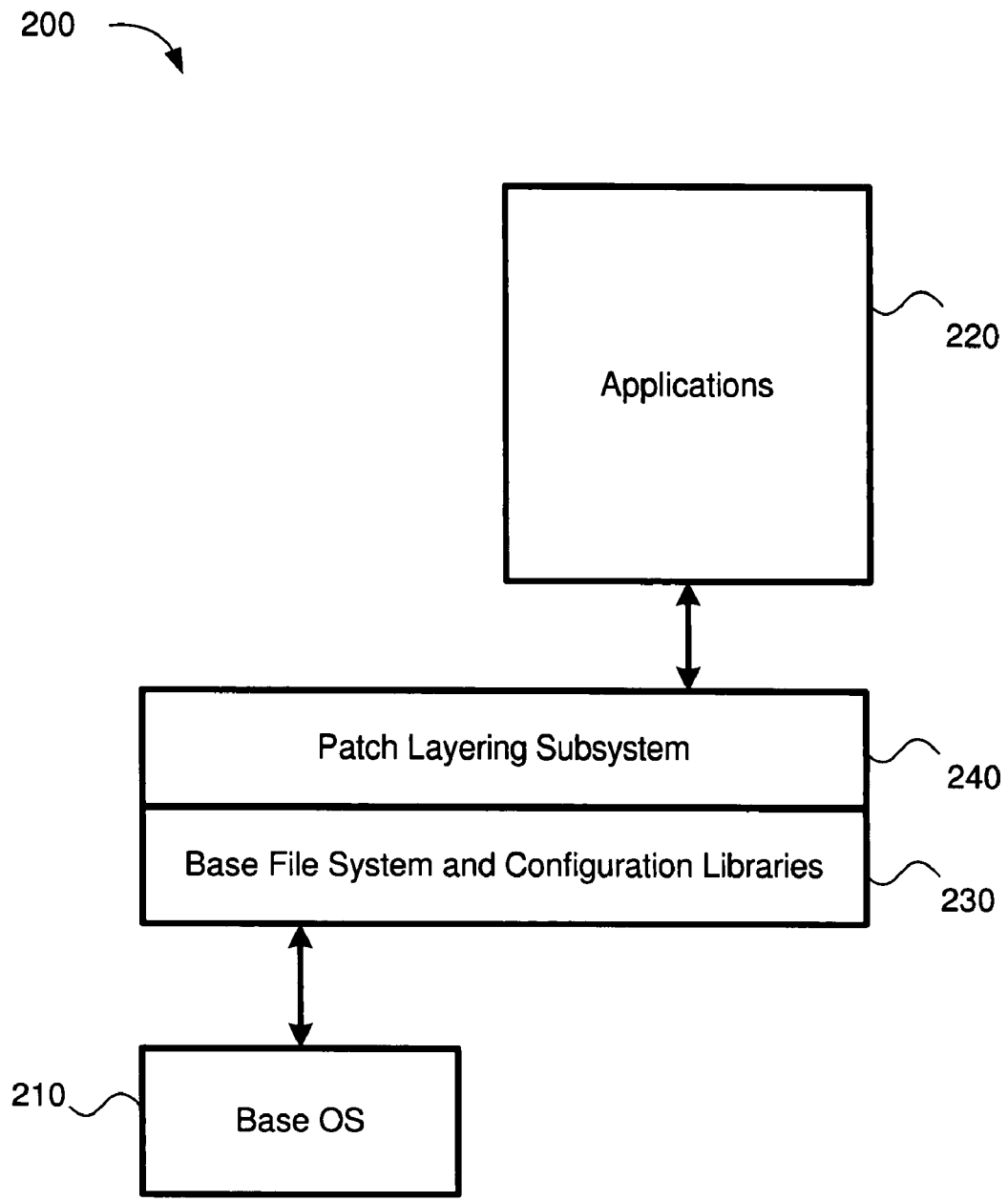
FIG. 2A illustrates an exemplary patch system having a patch layering subsystem in a computing device environment.

As shown in FIG. 2A, an exemplary computing device environment may include a base operating system ("base OS") 210 forming a platform with which applications 220 (e.g., software applications) can be run and files can be accessed in file systems. In certain embodiments, base OS 210 comprises Microsoft Windows® operating system software.

Base OS 210 may include base configuration settings (e.g., registry settings) and files that are globally available to applications 220 for reading and writing operations. The configuration settings and files of the base OS 210 may be included in base file system and configuration libraries 230, also referred to as a base file system and configuration 230, for use in executing the functions of the base OS 210 including operating file systems, configuration settings such as registries, and other operating system functions. The base file system and configuration libraries 230, including the base files and configuration settings of the base OS 210, may be stored to a particular location in the memory of the computing device 120.

If a computer program patch were installed in the computing environment of FIG. 2A using traditional patching technologies, the files and/or configuration settings of the base OS 210 stored in memory would be replaced with patch content. This can make an uninstall of the patch extremely difficult, especially when files or configuration settings are overwritten in a computing system or when snapshots of the base files and configuration settings are not recently recorded before installation of a patch.

The patch system 200 may include a patch layering subsystem 240, which may be installed and configured to run on computing device 120. The patch layering subsystem 240 provides improved patching operations as compared to conventional patching technologies. The patch layering subsystem 240 may be configured to perform the patching operations described herein, including operations for receiving, virtually installing, enabling, disabling, testing, and/or committing patches. Thus, with the patch layering subsystem 240 installed, a computing device 120 is configured to patch computer programs stored on the computing device 120, including the applications 220 and/or base OS 210. The patch layering subsystem 240 can be installed to the computing device 120 in any suitable manner, including by executing an install executable received from the patch control subsystem 110.

In other embodiments, a subset of the patch layering subsystem 240 may be configured to run externally of the computing device 120, such as at the patch control subsystem 110 or on another computing device (e.g., server) that is accessible to the computing device 120. Accordingly, certain operations of the patch layering subsystem 240 may be provided as services (e.g., web services) to the computing device 120. Such a configuration may be useful for implementations in which computing resources are limited at the computing device 120. Typically, however, at least a portion of the patch layering subsystem 240 configured for intercepting access requests will be implemented at the computing device 120.

Patch layering subsystem 240 may be configured to intercept access requests (e.g., file system and registry access requests) from applications 220 or other computer programs and to determine, based on predefined mapping data, where to direct the access requests. Accordingly, patch layering subsystem 240 may selectively redirect access requests for content of the base OS 210 to content of a virtually installed and enabled patch that has been stored at a separate and isolated location in memory, such as in a patch layer as described further below. The virtual install of the patch allows redirections to be performed such that the applications 220 and operating system of the computing device 210 are unaware of the redirections.

The patch layering subsystem 240 may be implemented in any manner that allows it to intercept access requests directed to content in the base file system and configuration libraries 230 (e.g., files and configuration settings of the base OS 210) and selectively redirect the access requests to patch content stored at another memory location. In certain embodiments, the patch layering subsystem 240 is associated with the base file system and configuration 230 and/or the base OS 210. As an example, at least a portion of the patch layering subsystem 240 may be implemented as one or more drivers (e.g., filter drivers) at the operating system kernel level and configured to monitor input and output requests for files and configuration settings stored in the base file system and configuration libraries 230. This may be accomplished by monitoring calls that go through an OS kernel I/O subsystem.

In certain embodiments, functionality for intercepting and redirecting access requests may be implemented based at least in part on the teachings of one or more of the references that have already been incorporated by reference, including the aforementioned U.S. Pat. No. 7,117,495, for example.

FIG. 2A illustrates the patch system 200 having the patch layering subsystem 240 installed and operating in a state in which there are no computer program patches virtually installed or enabled. Accordingly, the patch layering subsystem 240 is generally configured to permit access requests to continue on to content in the base file system and configuration libraries 230.

Figure 2B:
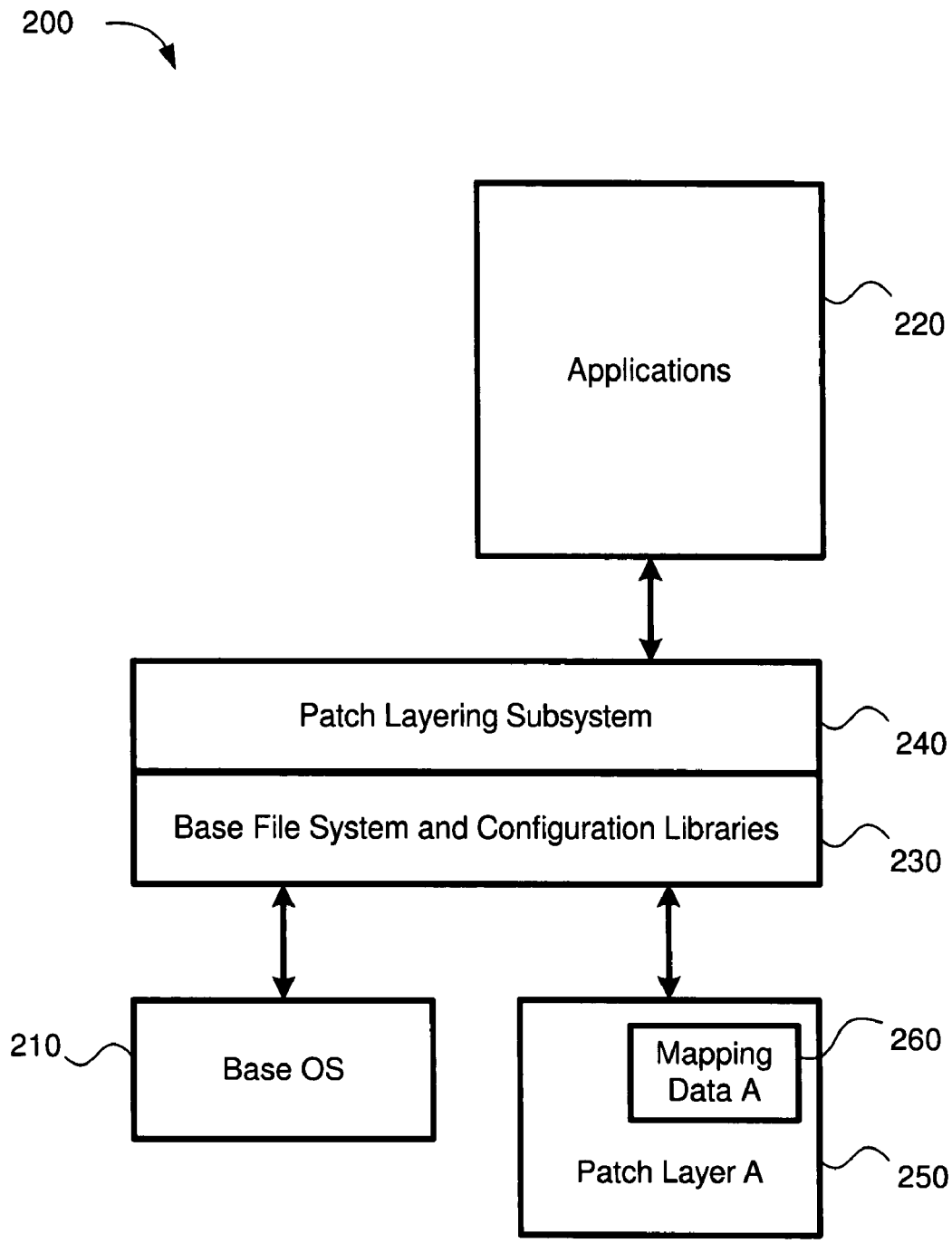
FIG. 2B illustrates the computing device environment of FIG. 2A with a patch layer virtually installed.

FIG. 2B illustrates the patch system 200 at a stage in which a patch ("Patch A") has been received and virtually installed on computing device 120. The patch may be received from any suitable source and in any acceptable manner, including by transmission from the patch control subsystem 110 over network 130.

In certain embodiments, the patch layering subsystem 240 may receive and execute a patch executable to virtually install the patch. This virtual installation of the patch may include the steps of creating a patch layer 250 ("Patch Layer A 250" for Patch A), storing content of the patch (e.g., one or more patch objects included in the patch) to the patch layer 250, and generating and storing mapping data 260 ("Mapping Data A 260" for Patch Layer A 250). As shown in FIG. 2B, in some embodiments the mapping data 260 may be stored in the patch layer 250. Alternatively, the mapping data 260 may be stored at another location external of the patch layer 250.

In other embodiments, the patch layering subsystem 240 may receive exported data representative of a patch layer from the patch control subsystem 110, in which case the patch layering subsystem 240 may use the received data to virtually install the content in the patch layer. For example, the patch control subsystem 110 may use a patch executable to create a patch layer that can be exported to one or more computing devices 120. The data received from the patch control subsystem 110 may include the mapping data 260 or may include information that can be used by the patch layer subsystem 240 to generate and store the mapping data 260. The patch layering subsystem 240 may store the received and/or generated content to a location in memory that becomes patch layer 250.

Operations for virtually installing patches, including the exemplary operations described above, may be performed base on or otherwise utilizing teachings of one or more of the references that have been incorporated by reference, including teachings related to "capture" operations and the creation of "layers" as disclosed in the aforementioned U.S. Pat. No. 7,117,495, for example.

Patch layer 250 may include any content associated with a patch, including for example, a group of one or more patch objects (e.g., files and configuration settings), patch identification information, patch version information (e.g., a version number), patch release date information, timestamp information, and patch supersedure information identifying one or more other patches to be superseded by the patch. The patch layer 250 may include other information, including, but not limited to, prioritization information that can be used to identify prioritization of the patch layer 250 in relation to other patch layers 250, and layer type information indicative of the type of content included in the patch layer 250. For example, layer type information may identify patch layer 250 as being associated with patch content, thereby allowing the patch layer 250 to be treated differently from (e.g., prioritized over) other types of layers, as disclosed in the aforementioned U.S. patent application Ser. No. 11/528,858 filed Sep. 28, 2006.

In certain embodiments, layer type information may be used to distinguish different types of patches. For example, operating system patches can be distinguished from application patches by assigning them different layer types. Accordingly, OS patches can be recognized and processed in a custom manner, including making OS patch layers 250 available early in a boot cycle. As another example, patch prioritization (e.g., version checking) operations customized for OS patches may be employed to handle the potentially complex priority relationships within a group of virtually installed and enabled OS patch layers 250.

The patch layer 250 may be created at one or more memory locations that are isolated from the memory locations of the base file system and configuration 230. Instead of overwriting the memory locations of the base file system and configuration 230 as would happen in an actual installation of a patch, in a virtual installation the contents of the patch are stored to another memory location as patch layer 250, so as to preserve the contents of base file system and configuration 230.

As mentioned, the patch layer subsystem 240 and/or the patch control subsystem 110 may be configured to generate and store mapping data 260 associated with patch layer 250. The mapping data 260 may include definitions of one or more relationships between content of the patch layer 250 and content of the base file system and configuration 230, including files and configuration settings of the base OS 210. The mapping data 260 may be stored at any suitable location that can be accessed by the patch layering subsystem 240, including within the patch layer 250, for example.

As an example of generating mapping data 260, assume that Patch A includes a particular patch object (e.g. a DLL file) designed to replace a file object that is part of the base file system and configuration 230. During virtual installation of Patch A, the patch layering subsystem 240 can identify the file object and/or its location (e.g., pathname), the patch object and/or its location in the patch layer 250, and the relationship between the file object and the patch object and/or their respective locations. References to the identified information may be recorded and included as part of the mapping data 260. In this or another suitable manner, the mapping data 260 can be said to define relationships between the content of the patch layer 250 and the content of the base file system and configuration 230.

The mapping data 260 may include other information, including any information potentially helpful for identifying an appropriate location in memory to which an access request should be directed. By way of an example, the mapping data 260 may include priority information representative of priority relationships between multiple patch layers 250 or between specific content instances in a patch layer 250. In certain embodiments, the priority information may include or be based on version information associated with patches. Instances of mapping data 260 may be sorted or otherwise organized based on their respective priority information.

Information in the mapping data 260 may be formatted and organized in any way that is suitable for the information to be used for patching operations, including redirecting access requests, disabling patches, and committing patches. In certain embodiments, the mapping data 260 includes one or more tables of information organized such that the information can be searched by index, keyword, or other criterion.

In FIG. 2B, the patch (Patch A) is virtually installed as Patch Layer A 250 but is not enabled. Accordingly, the patch layering subsystem 240 will permit access requests to pass through to the base file system and configuration 230, without being considered for redirection to patch layer 250. In other words, the patch layering subsystem 240 is configured not to redirect access requests to Patch Layer A 250.

Figure 2C:
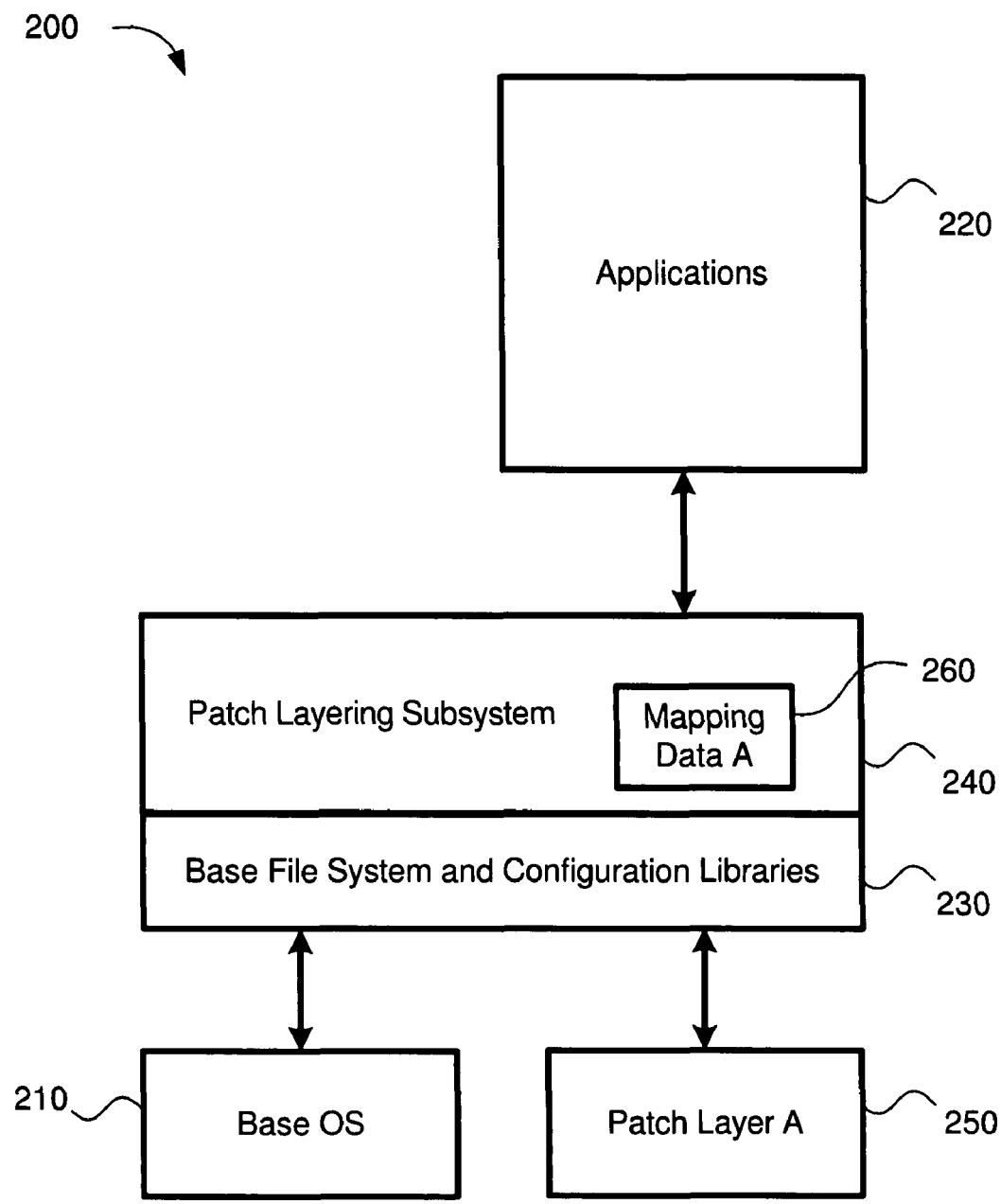
FIG. 2C illustrates the computing device environment of FIG. 2B with the virtually installed patch layer enabled.

FIG. 2C illustrates the patch system 200 at a stage in which Patch A has been virtually installed and the corresponding patch layer 250 enabled. The patch layering subsystem 240 may be configured to enable the patch layer 250, including enabling the patch layer 250 in response to receipt of an "enable command" from the patch control subsystem 110.

In certain embodiments, enablement of the patch layer 250 includes activating the mapping data 260 associated with the patch layer 250 by applying the mapping data 260 to the patch layering subsystem 240. In FIG. 2C, activation of the mapping data 260 is represented by Mapping Data A 260 being moved or a copy of Mapping Data A 260 being injected into the patch layering subsystem 240. In certain embodiments, this includes injecting the mapping data 260 into an OS kernel filter driver of the patch layering subsystem 240.

With the mapping data 260 activated, the patch layering subsystem 240 is configured to selectively redirect access requests from the base file system and configuration 230 to the patch layer 250. For example, the patch layering subsystem 240 may intercept an access request from an application 220, the request including a reference for a particular file object or memory location of the base file system and configuration 230. The patch layering subsystem 240 may use the activated mapping data 260 to determine whether the reference is associated with an enabled patch layer 250. This determination may be performed in any suitable manner, including searching the mapping data 260 for the reference. If a match is found, the patch layering subsystem 240 may redirect the access request to a corresponding patch object in the patch layer 250. The corresponding patch object may then be accessed and returned to the application 220, the application 220 being unaware of the redirection having taken place. Accordingly, from the view of the application 220, it is as if the virtually installed and enabled patch had been actually installed to the base file system and configuration 230.

It is not uncommon for multiple patches to be provided for a computer program, especially for an operating system. Accordingly, the patch layering subsystem 240 may be configured to virtually install and enable multiple patches and to compute redirections of access requests in a manner that accounts for priorities between the patches.

Patch layers 250 may be prioritized in any manner and using any information (e.g., patch version information) that allows a set of multiple virtually installed and enabled patches to accurately function, or at least appear to function, as if the patches had been actually installed to the base file system and configuration 230.

Figure 2D:
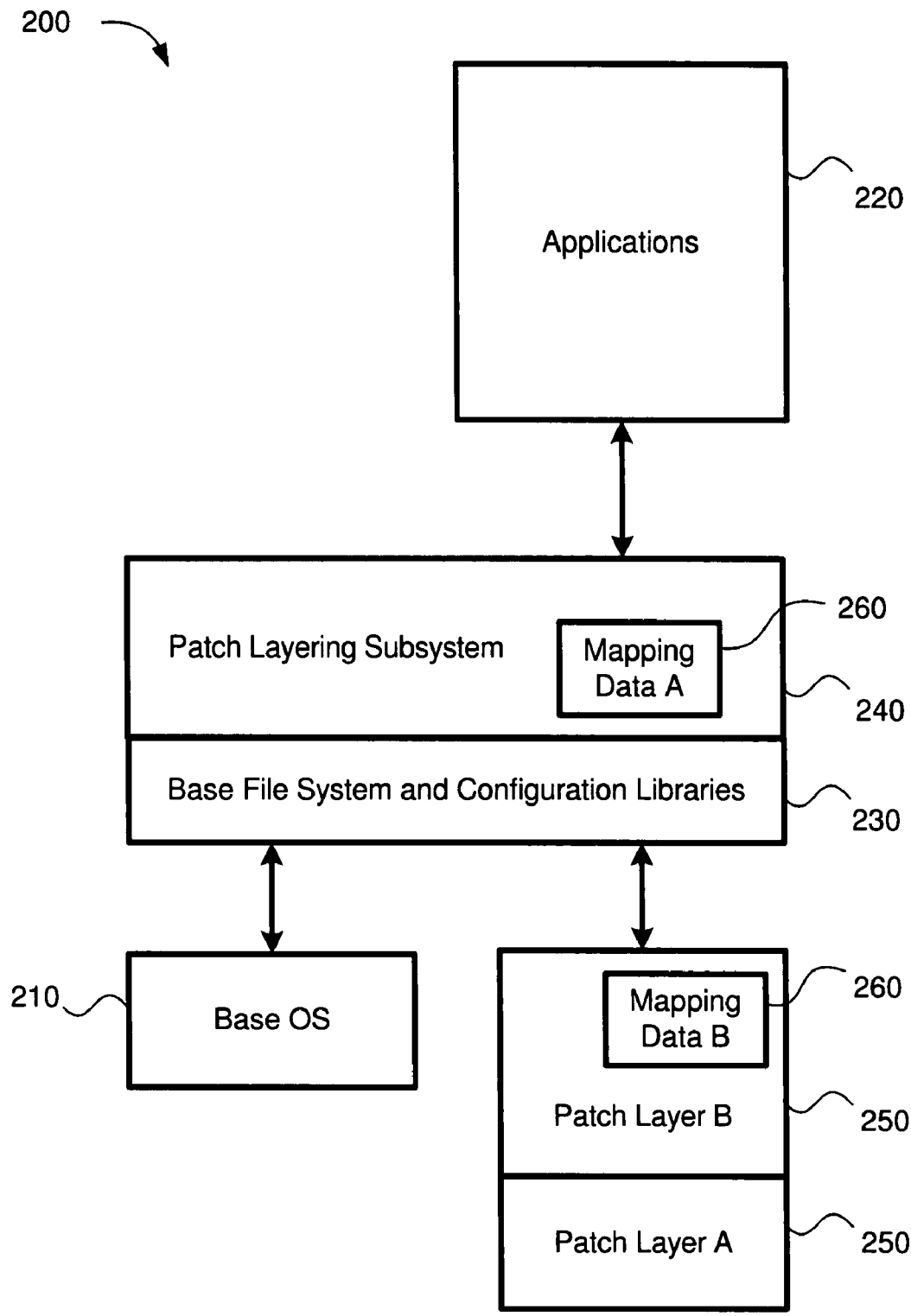
FIG. 2D illustrates the computing device environment of FIG. 2C with another patch layer virtually installed.

FIG. 2D illustrates the patch system 200 at a stage in which Patch A has been virtually installed and corresponding Patch Layer A 250 enabled, and another patch, "Patch B," has been virtually installed, but its corresponding patch layer 250, "Patch Layer B 250," is not enabled. The patch layering subsystem 240 may be configured to consider priority information for enabled patch layers 250 when determining where to redirect an access request. In the stage shown in FIG. 2D, only the mapping data 260 for Patch Layer A 250 would be considered because Patch Layer A 250 is the only enabled patch layer 250.

Figure 2E:
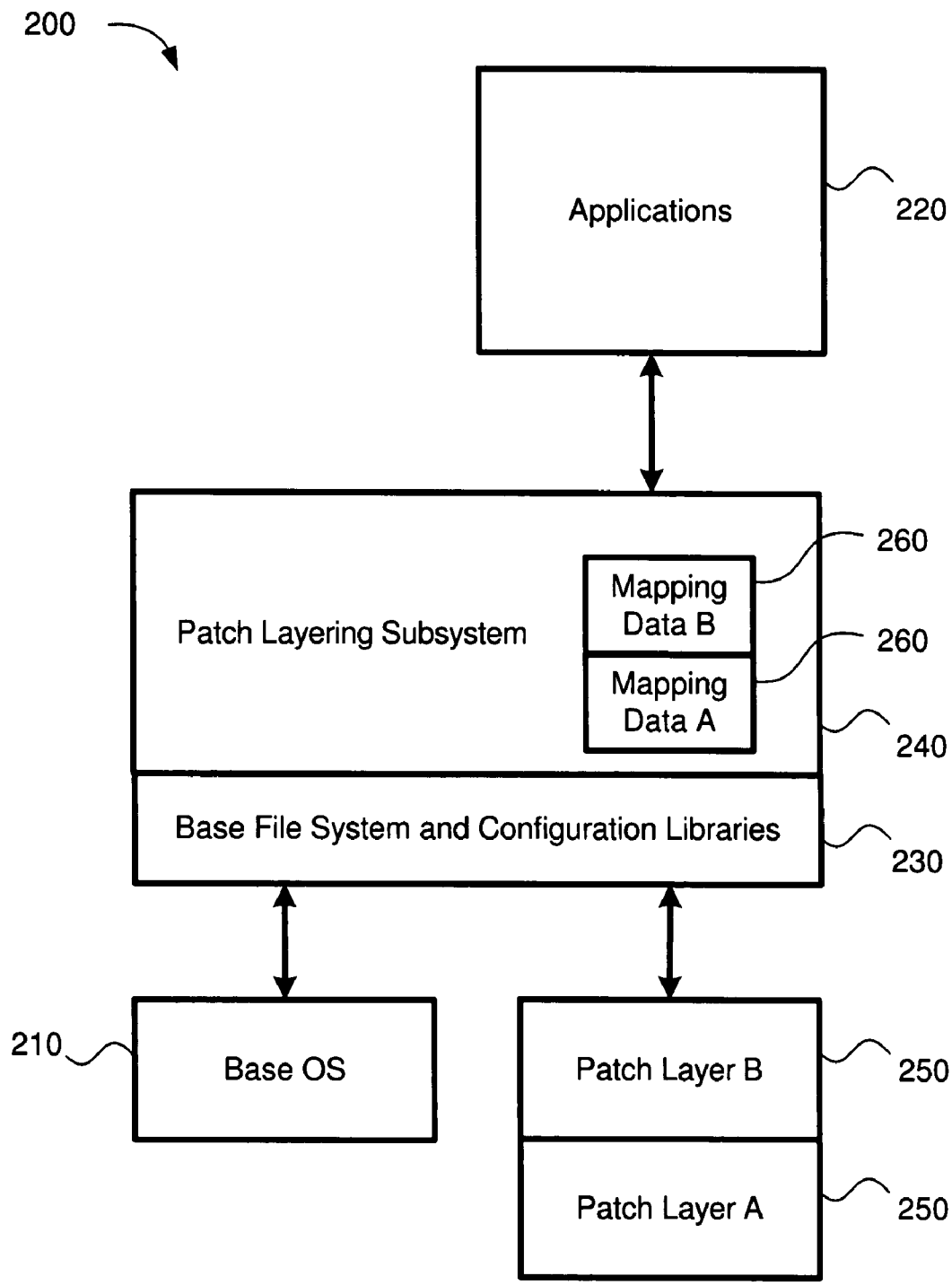
FIG. 2E illustrates the computing device environment of FIG. 2D with the other virtually installed patch layer enabled.

FIG. 2E illustrates the patch system 200 at a stage in which both Patch A and Patch B are virtually installed and enabled, as represented by the activation of Mapping Data A 260 and Mapping Data B 260 in the patch layering subsystem 240. In the stage shown in FIG. 2E, both patch layers 250, or at least the mapping data 260 for both patch layers 250, may be considered by the patch layering subsystem 240 when determining where to direct access requests. In particular, the priority or patch version information for the patch layers 250 may be considered to determine the appropriate prioritization between the patch layers 250. The prioritization may be based on information included in mapping data 260 for the patch layers 250, including any of the priority information mentioned above.

In the particular example shown in FIG. 2D, Patch Layer B 250 has priority over Patch Layer A 250. This priority may be indicated by the priority information included in the mapping data 260 for the patch layers 250. The mapping data 260 may be organized in any acceptable manner that allows the patch layering subsystem 240 to identify the priority relationships between patch layers 250.

In certain embodiments, the patch layering subsystem 240 may be configured such that when it intercepts an access request including a particular reference for a file or setting, the patch layering subsystem 240 will search for the reference first in the active mapping data 260 of the patch layer 250 having the highest priority. In the example of FIG. 2E, this would be Mapping Data B 260. If the reference is found in Mapping Data B 260, a redirection to Patch Layer B 250 is performed. If the reference is not found in Mapping Data B 260, patch layering subsystem 240 would next search for the reference in Mapping Data A 260, the mapping data 260 corresponding with the next highest priority patch layer 250—Patch Layer A 250. If the reference is found, a redirection to Patch Layer A 250 is performed. If the reference is not found in Mapping Data A 260, the access request is permitted to pass through to the base file system and configuration 230.

Prioritization of patch layers 250 enables the patch system 200 to operate with multiple patches virtually installed and enabled and in a manner that models the priorities intended to be implemented when the patches are actually installed.

Certain patches may be designed to supersede previous patches. The patch layering subsystem 240 may be configured to recognize and implement such supersedures in a virtual installation environment. For example, patches may include supersedure information indentifying one or more other patches to be superseded. Such information may be captured and included in the mapping data 260 associated with a patch layer 250. The patch layering subsystem 240 may be configured to recognize such information included in the mapping data 260. For example, when a patch layer 250 such as Patch Layer B 250 is enabled, the patch layer subsystem 240 may search the corresponding Mapping Data B 260 for supersedure information. If found, the supersedure information may be utilized to implement the intended supersedure. In certain embodiments, for example, the patch layering subsystem 240 may be configured to disable any enabled patch layers 250 associated with patches to be superseded by Patch B. For instance, the Mapping Data B 260 may include supersedure information indicating that Patch B is to supersede Patch A. Patch layering subsystem 240 may determine whether any of the enabled patch layers 250 correspond with Patch A. In this case, Patch Layer A 250 may be identified as corresponding with Patch A. Accordingly, when Patch Layer B 250 is enabled, the patch layering subsystem 240 may automatically disable Patch Layer A 250 based on the supersedure information in Mapping Data B 260.

While supersedure is described above in terms of a virtual patch being enabled, the patch layering subsystem 240 may alternatively or additionally be configured to perform supersedure operations when a virtual patch is committed to the base file system and configuration 230. Accordingly, in the case described above, when Patch Layer B 250 is committed, the patch layering subsystem 240 may automatically disable Patch Layer A 250 based on the supersede information in Mapping Data B 260. The committing of a virtually installed patch to the base file system and configuration 230 is described further below.

Of course, patch layering subsystem 240 may be configured to perform other actions based on supersedure information. In the example above, for instance, patch layering subsystem 240 may be configured to provide a notification message informing a user of computing device 120 or patch control subsystem 110 that a supersede has been detected and providing the user an opportunity to approve or disapprove the performance of an action based on the supersedure information. As an example, a user may be asked to approve the proposed disabling of Patch Layer A 250.

In the above described manner, intended patch supersedures can be implemented in a virtual patch environment. This can help conserve processing resources at least by minimizing the number of patch layers that are virtually installed and enabled at a given time and avoiding the execution of redundant or unnecessary operations.

Another way patch layer subsystem 240 can conserve processing resources is to combine multiple patch layers 250 into a composite patch layer. As more and more patch layers 250 are virtually installed and enabled on a computer device 120, keeping track of prioritization between the layers 250 and redirecting large numbers of access requests can become complex and create a significant drain on processing resources. Combining multiple patch layers 250 into a composite patch layer can help alleviate this problem. In embodiments in which the multiple patch layers 250 are prioritized, this combining may be referred to as "flattening."

Figure 2F:
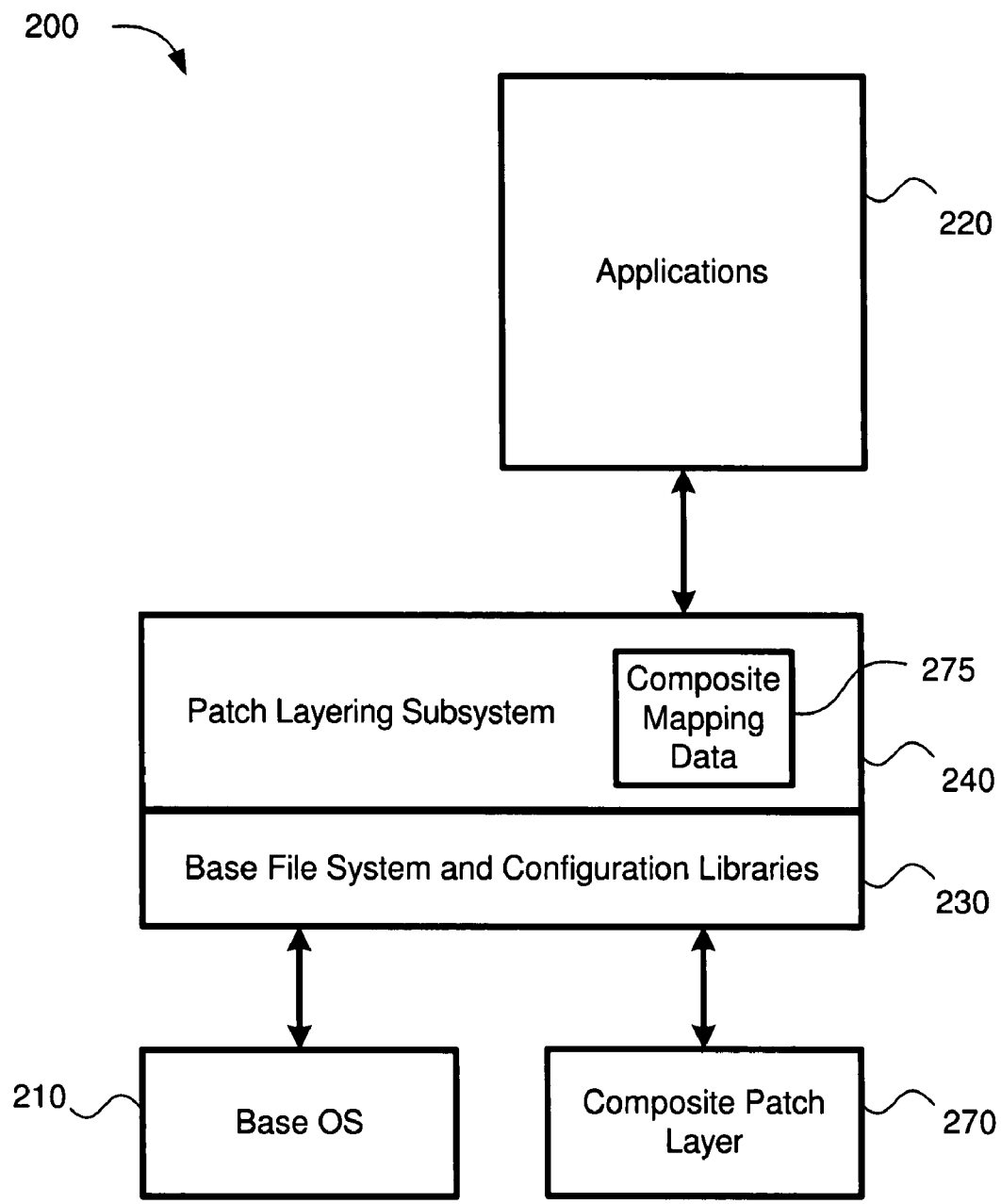
FIG. 2F illustrates the computing device environment of FIG. 2E with the patch layers combined into a composite patch layer.

FIG. 2F illustrates the patch system 200 at a stage in which Patch Layers A and B 250 have been combined to form a composite patch layer 270. Mapping Data A 260 and Mapping Data B 260 have also been combined to form composite mapping data 275 associated with the composite patch layer 270. Composite mapping data 275 may be generated as the composite patch layer 270 is created and/or based on the contents of the mapping data 260 for the individual patch layers 250.

In FIG. 2F, the composite patch layer 270 has been enabled by creating and applying composite mapping data 275 to the patch layering subsystem 240. The individual patch layers A and B 250 have been disabled and removed from computing device 120. However, patch layers A and B 250 may be disabled and kept virtually installed on computing device 120. One reason for doing this would be to maintain the ability to easily revert back to using patch layers A and B 250 should composite patch layer 270 or composite mapping data 275 not function properly.

In certain embodiments, operations by which patch layers 250 are combined may include identifying and omitting redundant and/or outdated patch content when the composite patch layer is generated. Such patch content may be identified based on the mapping data 260 for the individual patch layers 250. For a particular reference to the base file system and configuration 230, for example, mapping data 260 for the individual patch layers 250 may be searched. If only a single match is found, the associated content in the corresponding patch layer 250 may be included in the composite patch layer 270. If more than one instance of the reference is found in the mapping data 260, the prioritization information in the mapping data 260 may be checked to determine the patch content having the highest priority and that will be consequently included in the composite patch layer 270.

With a patch virtually installed and enabled as a patch layer 250 on a computing device 120, the virtual patch may be tested for proper operation. Testing may include any operations capable of producing data or another outcome helpful for identifying whether a virtually installed and enabled patch has introduced a problem into the computing device 120 or the computer programs configured to operate on the computing device 120. Testing may take various forms. In certain embodiments, the computing device 120 may be permitted to perform standard or common operations for a period of time or to perform a predefined list of operations. During execution of the test operations, data associated with the operations and/or errors may be tracked and reported. The tracked data may be used to help determine whether an enabled virtual patch is functioning properly. In certain examples, the patch control subsystem 110 may be configured to initiate and control test operations on the computing device 120 and to receive test data from the computing device 120. Accordingly, a virtually installed and enabled patch may be tested from a remote location and may allow an administrator to perform testing of the patch over a network 130.

The patch layer subsystem 240 may be configured to disable an enabled patch layer 250. The ability to conveniently disable an enabled patch provides a significant advantage over conventional patching technologies. For instance, if testing of an enabled patch indicates that the patch is not functioning properly or has introduced a problem, the patch can be conveniently disabled instead of having to expend valuable resources troubleshooting and attempting to uninstall an actually installed patch after a problem is discovered. As an example, the virtually installed and enabled Patch Layer A 250 illustrated in FIG. 2C may be disabled by reversing the application of Mapping Data A 260 to the patch layering subsystem 240. The reversal may be performed in any suitable manner. In certain embodiments, this includes removing Mapping Data A 260 from the patch layering subsystem 240 such that the patch layering subsystem 240 is returned to a state at which it existed prior to the application of Mapping Data A 260. FIG. 2B illustrates the patch system 200 at a stage at which Patch Layer A 250 is disabled. Mapping Data A 260 may include one or more identifiers useful for identifying Mapping Data A 260 as being associated with Patch Layer A 250 and removing the mapping date 260 from the patch layering subsystem 240.

The capability to conveniently disable patch layers 250 provides several benefits, including, but not limited to, easy remediation from a virtual patch install, control over which virtual patches are enabled, convenient and optionally automatic supersedure of virtual patches, less costly testing of patches as compared to traditional techniques, and reduced risk for implementing patches.

The patch layering subsystem 240 may be configured to commit, i.e., actually install, virtual patches to the base file system and configuration 230. In certain embodiments, the committing of a virtual patch may be performed using the patch layer 250 and/or the mapping data 260 of the patch layer 250 corresponding to the patch. For example, the mapping data 260 associated with patch layer 250 can be used by the patch layering subsystem 240 to identify and locate patch content and the appropriate locations of the base file system and configuration 230 to which the patch content should be written to actually install the patch. When the actual installation is complete, the patch is said to have been "committed," and the patch layer 250 for the virtually installed patch can be disabled. The disabled patch layer 250 may be optionally deleted from the computing device 120. Operations for committing a virtual patch may be controlled (e.g., initiated) from the patch control subsystem 110.

Figure 2G:
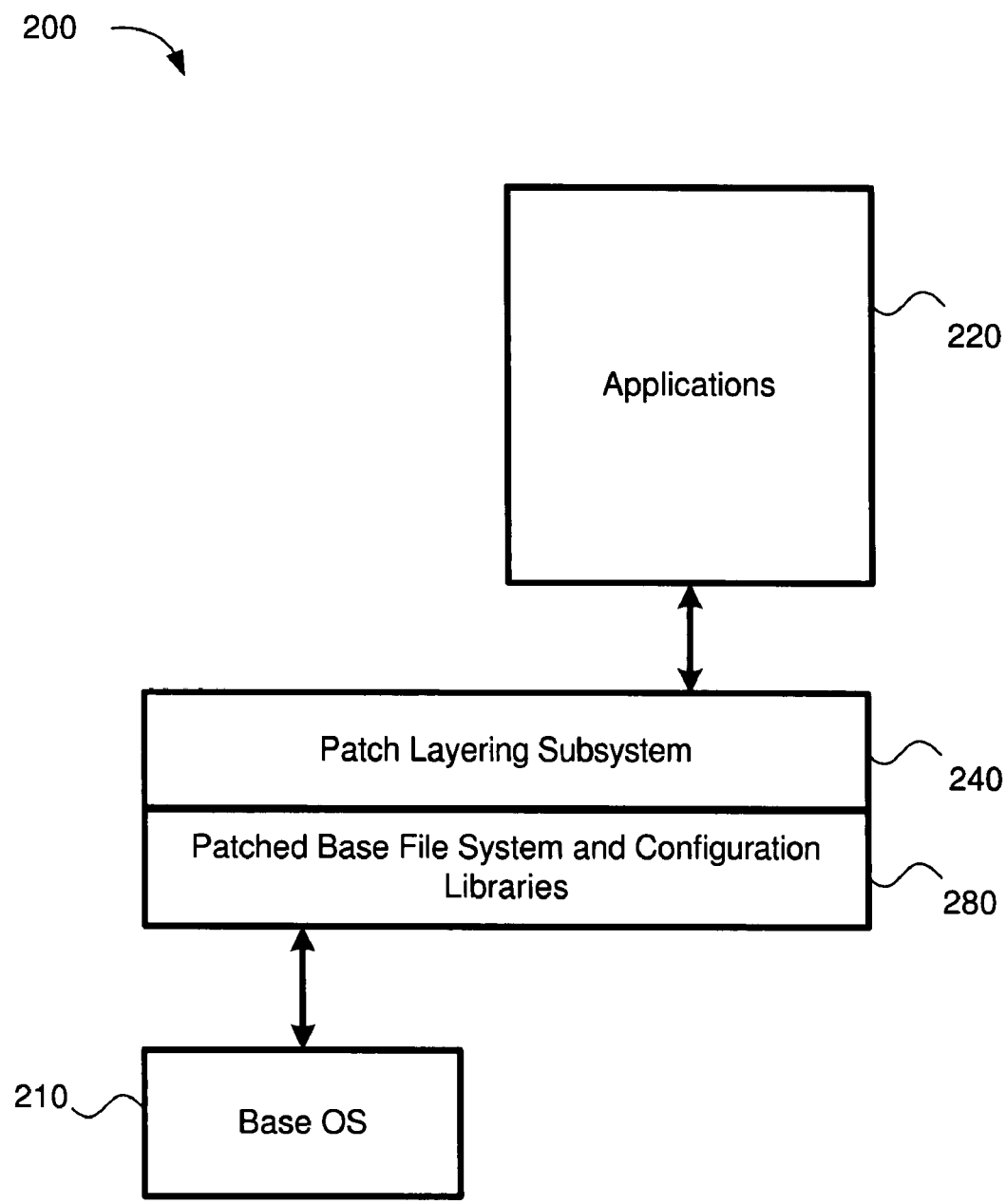
FIG. 2G illustrates the computing device environment of FIG. 2B with the patch actually installed ("committed") to the base file system and configuration.

Accordingly, if it is determined through testing and/or normal operations that a virtually installed patch is functioning properly or at least at an acceptable level, the virtual patch can be conveniently committed, i.e., actually installed to the base file system and configuration 230. FIG. 2G illustrates the patch system 200 at a stage at which the patch associated with Patch Layer A 250 has been committed to the base file system and configuration 230, which has been transformed into a patched base file system and configuration 280. FIG. 2G further shows that Patch Layer A 250 has been both disabled and deleted from the computing device 120.

Virtual patches may be committed individually or in batches. Batch processing can be used to commit a group of virtual patches, such as all currently enabled virtual patches on computing device 120. The order in which virtual patches in a batch are committed may be determined based on the priority information in their mapping data 240. Alternatively, a user may define an order for committing multiple patches.

The capability of conveniently committing patch layers 250 provides several benefits, including, but not limited to, reduced risk in actually installing a patch at least because the virtual patch as tested can be used for the actual install, a capability to maintain the number of virtually installed and enabled patches at an acceptable level by committing the virtual patches that have been verified, a capability to make room for new patches in the virtual patching environment, and a capability to patch the base file system and configuration 230 as intended by manufacturers of patches after using virtual patching techniques to first test the patches.

Figure 3:
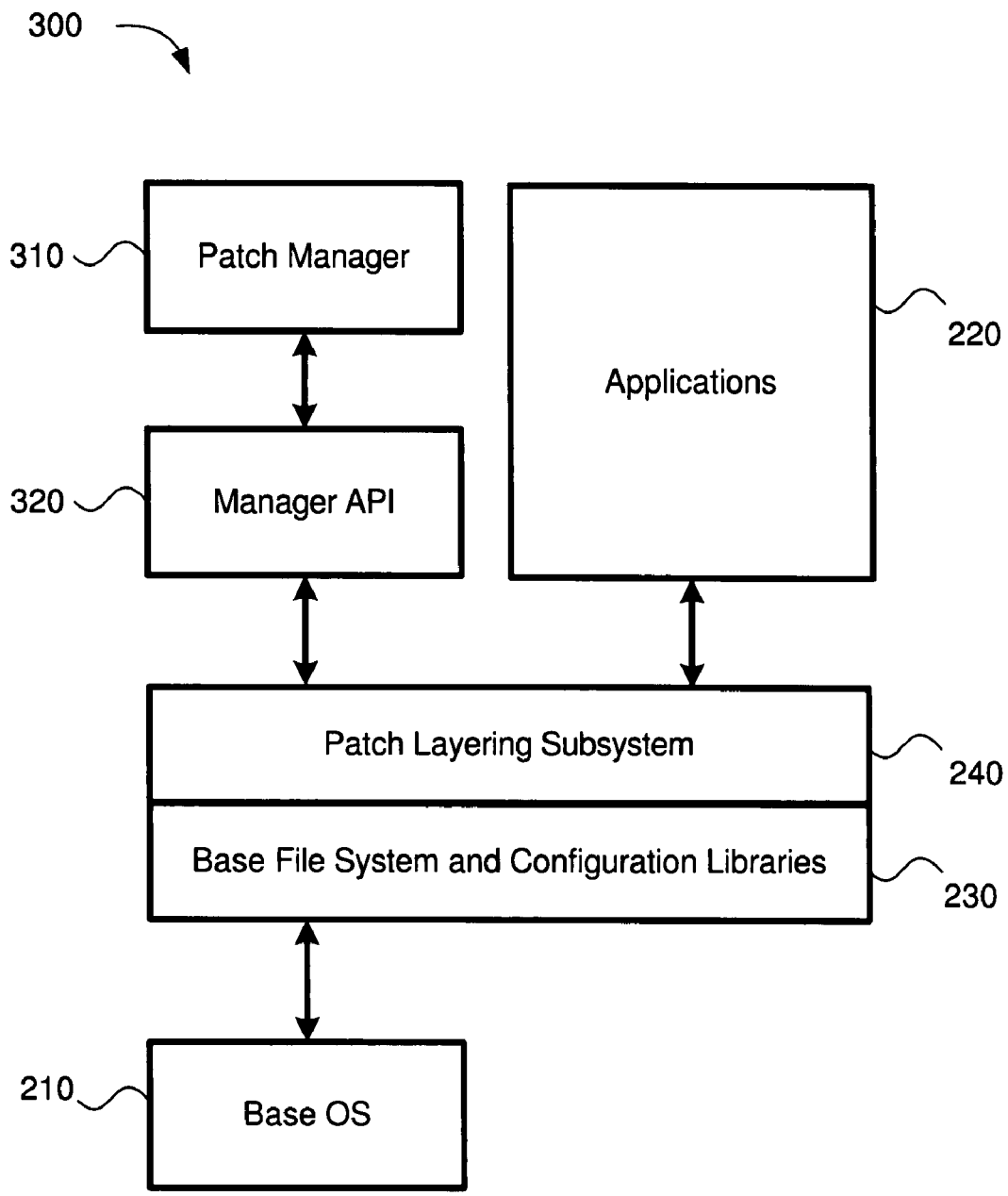
FIG. 3 illustrates the computing device environment of FIG. 2A and further including a patch layer management application.

System 100 may provide a user with one or more tools for managing or otherwise controlling the patching of computer programs. As an example, FIG. 3 illustrates an exemplary patch system 300, which in addition to the elements of patch system 200 includes a patch manager 310 and manager API 320. The manager API 320 allows the patch manager 310 to communicate with the patch layering subsystem 240. Accordingly, the patch manager 310 can be used to manage the settings and operations of the patch layering subsystem 240. For example, a user, through the patch manager 310, may instruct the patch layering subsystem 240 to perform certain operations or modify settings, including modifying mapping data 260 in patch layering subsystem 240. A backup unaltered copy of the mapping data 260 may be maintained at another location such as within the corresponding patch layer(s) 250. The patch manager 310 may be implemented at the computing device 120, patch control subsystem 110, or any external device that can communicate with patch layering subsystem 240.

Exemplary Methods

Figure 4:
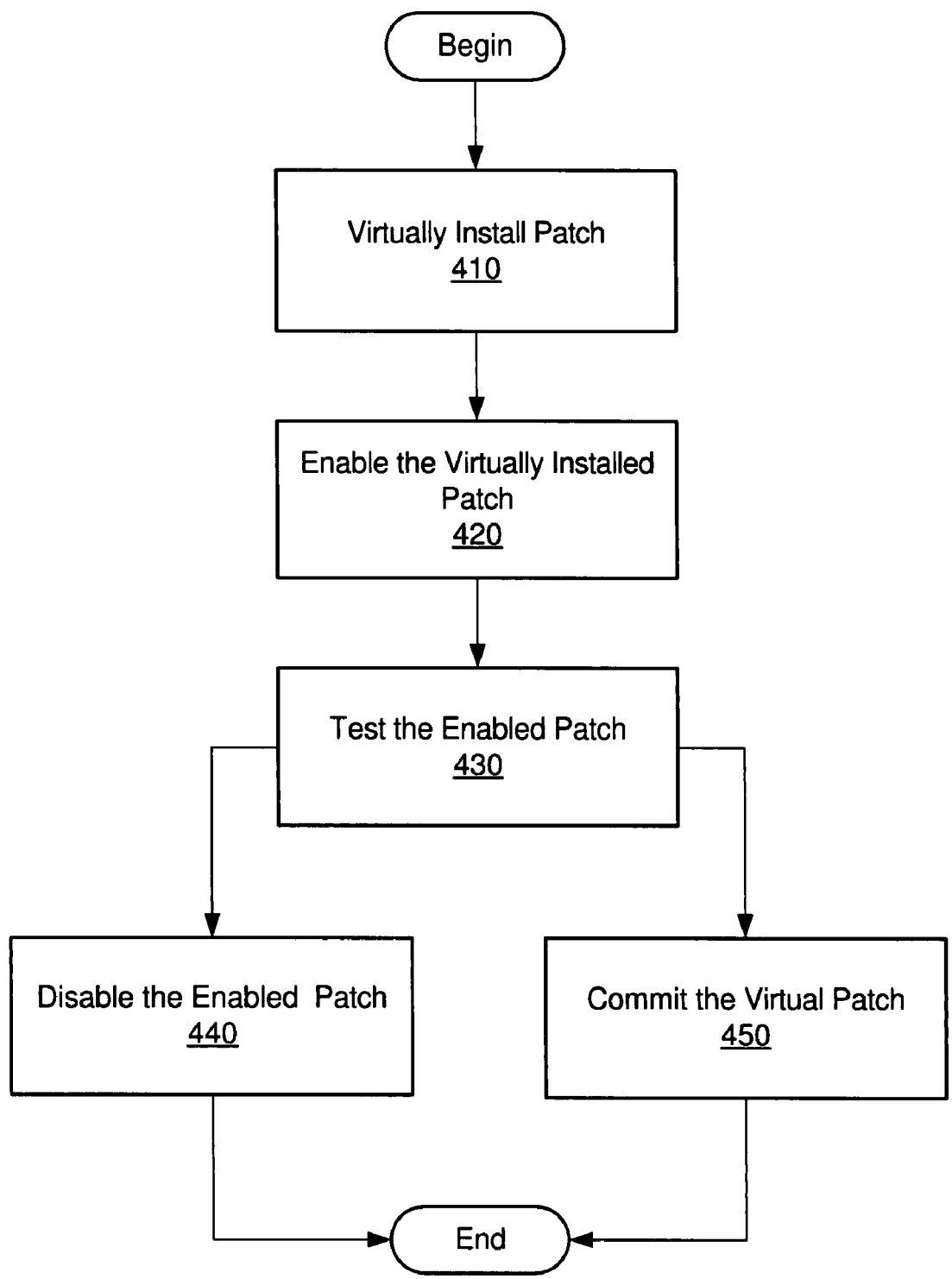
FIG. 4 illustrates an exemplary method of patching a computer program.

FIG. 4 illustrates an exemplary method of patching a computer program. While FIG. 4 illustrates exemplary steps according to one embodiment, other embodiments may omit, add to, reorder, and/or modify any of the steps shown in FIG. 4.

In step 410, a patch is virtually installed. Step 410 may be performed in any of the ways described above, including the patch layering subsystem 240 creating a patch layer 250, storing patch content to the patch layer 250, and generating and storing mapping data 260 representative of relationships between content of the patch layer 250 and content of base files and configuration settings such as may be stored in the base file system and configuration libraries of a computing device 120.

In step 420, the virtually installed patch is enabled. Step 420 may be performed in any of the ways described above, including applying the mapping data 260 associated with the patch layer 250 to the patch layering subsystem 240, for example.

In step 430, the enabled patch is tested. Step 430 may be performed in any of the ways described above, including conducting normal operations of the computing device 120 and/or instructing the computing device 120 to perform predefined operations designed to test the functionality of the enabled patch.

As shown in FIG. 4, processing may move from step 430 to either step 440 or 450. The determination of whether to proceed to step 430 or 440 may be based on the results of step 430 or on the indication of a user of system 100. The flow from step 430 to step 440 or 450 is illustrative only. In other embodiments, step 440 may be performed at any time or in any order to disable an enabled patch and step 450 may be performed at any time or in any order to commit a virtually installed patch.

In step 440, the enabled patch is disabled. Step 440 may be performed in any of the ways described above, including reversing the application of mapping data 260 to the patch layering subsystem 240.

In step 450, the virtually installed patch is committed. Step 450 may be performed in any of the ways described above, including utilizing the mapping date 260 to transition a virtually installed patch to an actually installed patch.

Figure 5:
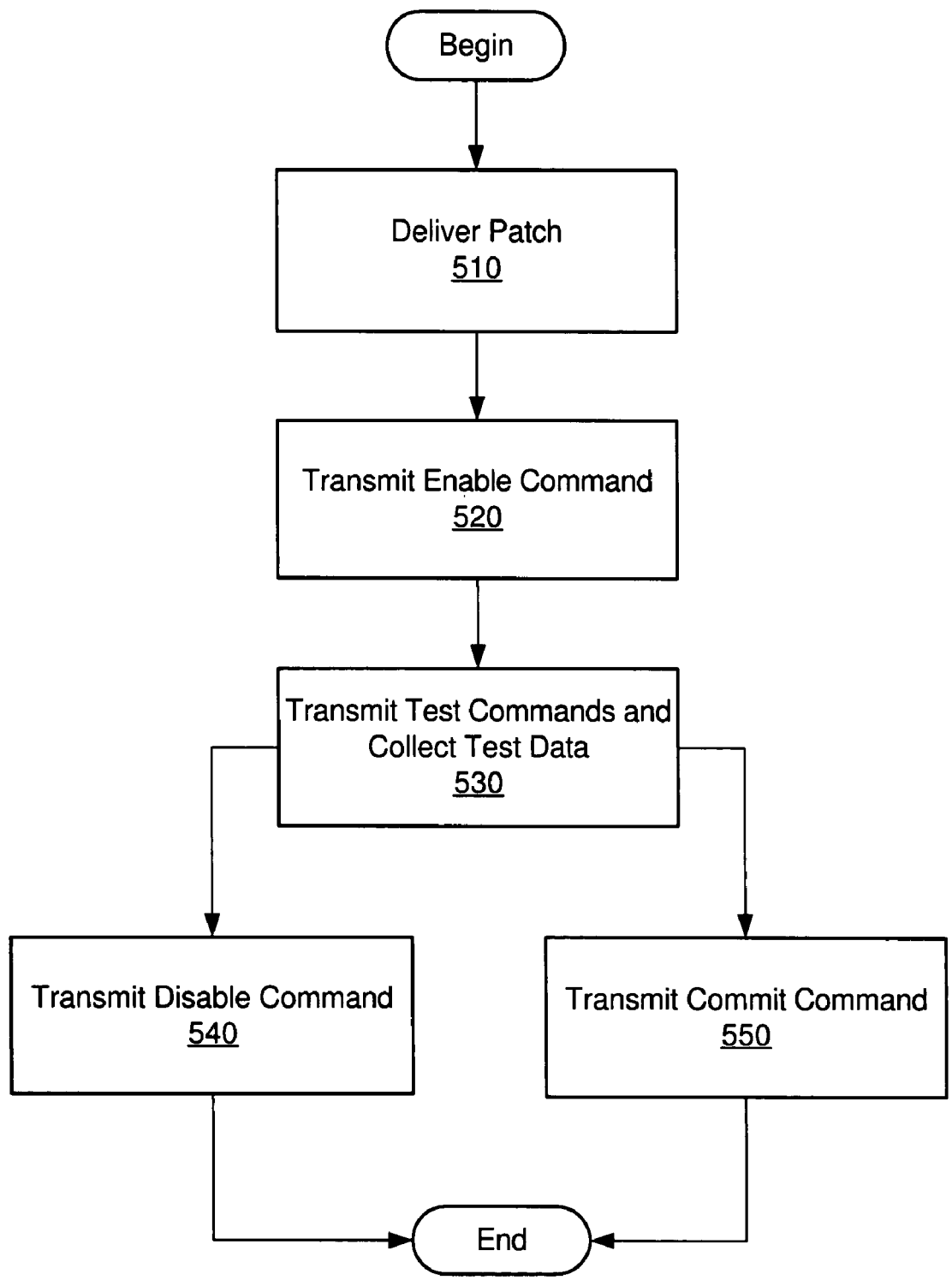
FIG. 5 illustrates an exemplary method of controlling the patching of a computer program.

FIG. 5 illustrates an exemplary method of remotely controlling the patching of a computer program from a remote device or location. While FIG. 5 illustrates exemplary steps according to one embodiment, other embodiments may omit, add to, reorder, and/or modify any of the steps shown in FIG. 5.

In step 510, a patch is delivered to a computing device 120. Step 510 may be performed in any of the ways described above, including the patch control subsystem 110 delivering data representative of the patch (e.g., a patch executable or patch layer) to the computing device 120 over network 130.

In step 520, an enable command is transmitted. Step 520 may be performed in any of the ways described above, including the patch control subsystem 110 transmitting an enable command to the computing device 120 over network 130. The patch layering subsystem 240 of the computing device 120 may be configured to recognize and respond to the enable command by enabling a patch layer 250 corresponding with the patch delivered in step 510.

In step 530, one or more test commands are transmitted and test data is collected. Step 530 may be performed in any of the ways described above, including the patch control subsystem 110 transmitting test commands to the computing device 120 and receiving test data from the computing device 120 over network 130. The computing device 120 may be configured to recognize and respond to the test commands to test operations of the enabled patch.

As shown in FIG. 5, processing may move from step 530 to either step 540 or 550. The determination of whether to proceed to step 530 or 540 may be based on the results of step 530 or on the indication of a user of system 100. The flow from step 530 to step 540 or 550 is illustrative only. In other embodiments, step 540 may be performed at any time or in any order to transmit a disable command and step 550 may be performed at any time or in any order to transmit a commit command.

In step 540, a disable command is transmitted. Step 540 may be performed in any of the ways described above, including the patch control subsystem 110 transmitting a\disable command to the computing device 120 over network 130. The patch layering subsystem 240 of the computing device 120 may be configured to recognize and respond to the disable command by disabling a patch layer 250 corresponding with the enabled patch.

In step 550, a commit command is transmitted. Step 550 may be performed in any of the ways described above, including the patch control subsystem 110 transmitting a\commit command to the computing device 120 over network 130. The patch layering subsystem 240 of the computing device 120 may be configured to recognize and respond to the commit command by committing a virtually installed layer 250.

The preceding is merely a detailed description of several embodiments. While specific embodiments and applications have been illustrated and described, it is to be understood that the precise configuration and components disclosed herein is illustrative only and not limiting in any sense. Having the benefit of this disclosure, various modifications, changes, and variations will be apparent to those of ordinary skill in the art without departing from the spirit and scope of the principles disclosed. For example, those skilled in the art will recognize that certain embodiments may be implemented using a computer programmed with software or as circuitry, and that it is possible to program a general-purpose computer or a specialized device to implement such embodiments. Thus, to the maximum extent allowed by law, the scope of the invention is to be determined by the broadest permissible interpretation of the following claims and their equivalents, and shall not be restricted or limited by the foregoing detailed description.

What is claimed is:

1. A method, comprising:
   virtually installing a computer program patch to a computing device having a base file system and configuration, a computer program, and a patch layering subsystem, said step of virtually installing said computer program patch including:
      creating a patch layer that is isolated from said base file system and configuration such that patches stored to said patch layer are virtually installed and contents of said base file system and configuration are preserved instead of being overwritten;
      storing content of said patch to said patch layer, and
      generating and storing mapping data defining at least one relationship between said content in said patch layer and content of said base file system and configuration; and
      enabling said patch layer, including applying said mapping data to said patch layering subsystem such that said patch layering subsystem, while enabled, is configured to intercept access requests and selectively redirect the access requests from said base file system and configuration to said patch layer, wherein said patch layering subsystem does not redirect the access requests when said patch layer is disabled.

2. The method of claim 1, further comprising:
   disabling said patch layer, including reversing said step of applying said mapping data to said patch layering subsystem such that said patch layering subsystem is configured not to redirect the access requests to said patch layer.

3. The method of claim 1, further comprising:
   committing said virtually installed patch to said base file system and configuration, including performing an actual install of at least a subset of said content in said patch layer to said base file system and configuration based on said mapping data.

4. The method of claim 1, further comprising:
   virtually installing another computer program patch to said computing device, said step of virtually installing said another computer program patch including:
      storing content of said another computer program patch to another patch layer,
      generating and storing other mapping data defining at least one relationship between said content in said another patch layer and said content of said base file system and configuration, and
      prioritizing said patch layer and said another patch layer with respect to one another; and
   enabling said another patch layer, including applying said other mapping data to said patch layering subsystem such that said patch layering subsystem is configured for selectively redirecting the access requests from said base file system and configuration to said another patch layer.

5. The method of claim 4, further comprising:
   combining said patch layer and said another patch layer into a composite patch layer, and
   combining said mapping data and said other mapping data to form composite mapping data corresponding with said composite patch layer.

6. A system, comprising:
   a computing device having a computer program and a base file system and configuration; and
   a patch layering subsystem installed to said computing device and configured to:
   create a patch layer that is isolated from said base file system and configuration such that patches stored to said patch layer are virtually installed and contents of said base file system and configuration are preserved instead of being overwritten:
   virtually install a patch for said computer program to said patch layer by storing content of said patch to said patch layer and by generating and storing mapping data defining at least one relationship between said content in said patch layer and content of said base file system and configuration; and
   enable said patch layer, including applying said mapping data to said patch layering subsystem such that said patch layering subsystem such that said patch layering subsystem, while enabled, is configured to intercept access requests and selectively redirect the access requests from said base file system and configuration to said patch layer, and
   disable said patch layer such that said patch layering subsystem is configured not to redirect the access requests to said patch layer.

7. The system of claim 6, wherein said patch layering subsystem is configured to virtually install said patch by:
   storing content of said patch to said patch layer, said patch layer being separate from said base file system and configuration, and
   generating and storing mapping data defining at least one relationship between said content in said patch layer and content in said base file system and configuration.

8. The system of claim 7, wherein said patch layering subsystem is configured to enable said patch layer by activating said mapping data for use in intercepting the access requests and to disable said patch layer by reversing said activating of said mapping data.

9. The system of claim 7, wherein said patch layering subsystem is configured to commit said patch to said base file system and configuration using said mapping data and said content of said patch layer.

10. The system of claim 6, wherein said patch layering subsystem is further configured to:

virtually install another patch for said computer program to another patch layer, prioritize said patch layer and said another patch layer in relation to one another, enable said another patch layer such that said patch layering subsystem is configured for selectively redirecting the access requests from said base file system and configuration to said another patch layer, and disable said another patch layer such that said patch layering subsystem is configured not to redirect the access requests to said another patch layer.

11. The system of claim 10, wherein said patch layering subsystem is configured to prioritize said patch layer and said another patch layer based on at least one of patch version information, patch release date information, and patch timestamp information.

12. The system of claim 10, wherein said patch layering subsystem is further configured to combine said patch layer and said another patch layer into a composite patch layer.

13. The system of claim 10, wherein said another patch is intended to supersede said patch, said patch layering subsystem being configured to recognize supersedure information associated with said another patch layer and to automatically disable said patch layer when said another patch layer is enabled.

14. The system of claim 6, further comprising a patch control subsystem communicatively coupled to said computing device by a network, said patch control subsystem being configured to:

deliver said patch to said computing device, transmit an enable command to said computing device, said enable command being configured to instruct said patch layering subsystem to enable said patch layer, and transmit a disable command to said computing device, said disable command being configured to instruct said patch layering subsystem to disable said patch layer.

15. The system of claim 14, wherein said patch control subsystem is further configured to transmit a test command to said computing device, said test command being configured to instruct said computing device to perform at least one test operation for testing said enabled patch layer.

16. The system of claim 14, wherein said patch control subsystem is further configured to transmit a commit command to said computing device, said commit command being configured to instruct said patch layering subsystem to commit said patch layer to said base file system and configuration.

17. A computer program product embodied in a non-transitory computer readable medium and comprising computer instructions executable by a computing device to perform the functions of:

virtually installing a computer program patch to the computing device, including:
creating a patch layer that is isolated from a base file system and configuration such that patches stored to said patch layer are virtually installed and contents of said base file system and configuration are preserved instead of being overwritten;
storing patch content associated with said computer program patch to said patch layer, and
generating and storing mapping data defining at least one relationship between said patch content in said patch layer and content of said base file system and configuration of the computing device; and enabling said patch layer, including activating said mapping data for use in intercepting access requests and selectively redirecting the access requests from said base file system and configuration to said patch layer, wherein a patch layering subsystem does not redirect the access requests when said patch layer is disabled.

18. The computer program product of claim 17, further comprising computer instructions executable by the computing device to perform the functions of:

intercepting an access request;

determining from said mapping data whether requested content is in said patch layer;

redirecting said access request to said patch layer based on said mapping data when it is determined that said requested content is in said patch layer; and permitting said access request to continue to said base file system and configuration when it is determined that said requested content is not in said patch layer.

19. The computer program product of claim 17, wherein virtually installing said computer program patch comprises isolating said computer program patch from said base file system and configuration without overwriting memory locations of said base file system and configuration.

20. The computer program product of claim 17, further comprising computer instructions executable by the computing device to perform the function of committing said virtually installed computer program patch to said base file system and configuration based on said mapping data by overwriting memory locations of said base file system and configuration with said computer program patch.

* * * * *